(12) United States Patent
Arai et al.

(10) Patent No.: US 11,567,339 B2
(45) Date of Patent: Jan. 31, 2023

(54) OPTICAL UNIT WITH SHAKE CORRECTION FUNCTION AND METHOD OF PRODUCING OPTICAL UNIT WITH SHAKE CORRECTION FUNCTION

(71) Applicant: NIDEC SANKYO CORPORATION, Nagano (JP)

(72) Inventors: Tsutomu Arai, Nagano (JP); Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 316 days.

(21) Appl. No.: 16/784,904

(22) Filed: Feb. 7, 2020

(65) Prior Publication Data
US 2020/0257131 A1 Aug. 13, 2020

(30) Foreign Application Priority Data

Feb. 7, 2019 (JP) .............................. JP2019-020567
Dec. 13, 2019 (JP) .............................. JP2019-225428

(51) Int. Cl.
*G02B 27/64* (2006.01)
*G03B 5/06* (2021.01)

(52) U.S. Cl.
CPC .............. *G02B 27/646* (2013.01); *G03B 5/06* (2013.01); *G03B 2205/0023* (2013.01); *G03B 2205/0069* (2013.01)

(58) Field of Classification Search
CPC ........ G02B 27/646; G02B 7/021; G03B 5/06; G03B 2205/0023; G03B 2205/0069; G03B 17/02; G03B 5/00; H02K 41/0356; H04N 5/2254; H04N 5/23287
See application file for complete search history.

(56) References Cited

U.S. PATENT DOCUMENTS

| 10,212,819 B2* | 2/2019 | Ahn ..................... G06F 3/0412 |
| 2010/0091120 A1* | 4/2010 | Nagata ................ H04N 5/2257 359/557 |
| 2012/0250156 A1* | 10/2012 | Asakawa ............. H02K 41/031 359/554 |

(Continued)

FOREIGN PATENT DOCUMENTS

| JP | 2018169499 A | 11/2018 |
| WO | WO-2019225365 A1 * | 11/2019 |

OTHER PUBLICATIONS

Machine translation of WO2019/225365 A1 retrieved electronically from Espacenet Mar. 30, 2022 (Year: 2022).*

*Primary Examiner* — Cara E Rakowski
(74) *Attorney, Agent, or Firm* — Cantor Colburn LLP

(57) ABSTRACT

A shake correction optical unit with a shake correction function may cause a movable body including an optical module to swing around an X axis and a Y axis that are perpendicular to an optical axis L. A flexible printed board may include a second folded portion drawn from the movable body in a +Y direction, and bent in a direction of the optical axis L and folded once; and a first folded portion bent to extend from the second folded portion in the +Y direction and folded once. At least one of the second folded portion or the first folded portion may be thus easily bendable when the movable body swings in either direction around the X axis or around the Y axis.

23 Claims, 17 Drawing Sheets

(56) References Cited

U.S. PATENT DOCUMENTS

| | | | |
|---|---|---|---|
| 2013/0136437 A1* | 5/2013 | Asakawa | G02B 27/64 396/55 |
| 2013/0182325 A1* | 7/2013 | Minamisawa | G02B 27/646 359/554 |
| 2014/0028863 A1* | 1/2014 | Takei | H04M 1/0264 348/208.11 |
| 2015/0277140 A1* | 10/2015 | Minamisawa | G03B 5/06 359/557 |
| 2016/0241786 A1* | 8/2016 | Minamisawa | H04N 5/2257 |
| 2018/0284476 A1* | 10/2018 | Minamisawa | G03B 5/06 |
| 2018/0284477 A1* | 10/2018 | Minamisawa | G03B 17/02 |
| 2019/0346748 A1* | 11/2019 | Kameyama | G03B 5/00 |
| 2021/0041715 A1* | 2/2021 | Takei | G02B 7/026 |
| 2021/0041716 A1* | 2/2021 | Takei | G03B 5/06 |
| 2021/0041717 A1* | 2/2021 | Takei | G03B 17/561 |
| 2022/0091477 A1* | 3/2022 | Minamisawa | G02B 7/04 |

* cited by examiner

OPTICAL UNIT WITH SHAKE CORRECTION FUNCTION AND METHOD OF PRODUCING OPTICAL UNIT WITH SHAKE CORRECTION FUNCTION

CROSS REFERENCE TO RELATED APPLICATION

The present application claims priority under 35 U.S.C. § 119 to Japanese Application No. 2019-020567 filed on Feb. 7, 2019 and Japanese Application No. 2019-225428 filed on Dec. 13, 2019, the entire content of which is incorporated herein by reference.

BACKGROUND

Field of the Invention

At least an embodiment of the present invention relates to an optical unit with a shake correction function that corrects shake of an optical module and a method of producing the same.

Description of the Related Documents

An optical unit mounted on a mobile terminal or a moving body may include a mechanism that corrects shake by swinging or rotating a movable body, where an optical module is mounted, to reduce disturbance of a captured image during movement of the mobile terminal or the moving body. Japanese Unexamined Patent Application Publication No. 2018-169499 discloses an optical unit with a shake correction function of this type.

The optical unit with a shake correction function of Japanese Unexamined Patent Application Publication No. 2018-169499 includes a flexible printed board coupled to a movable body where an optical module is mounted. The flexible printed board includes a power supply line to the optical module and a signal line for taking out a signal from the optical module. The flexible printed board is routed in a form that allows the movable body to swing and rotate.

According to Japanese Unexamined Patent Application Publication No. 2018-169499, the flexible printed board is routed such that the flexible printed board is bent once in a U-shape at a rear side of the optical module in a direction of an optical axis and then drawn outward in a radial direction of a fixation body surrounding the optical module. A bent portion provided in a middle of the flexible printed board makes it possible to restrain an increase in a swinging load due to resistance during a movement of the flexible printed board following swing of the movable body. However, providing the bent portion of the flexible printed board at the rear side of the optical module in the direction of the optical axis is unfavorable for thickness reduction because of an increase in a height of the optical unit with a shake correction function in the direction of the optical axis.

To reduce a thickness of the optical unit with a shake correction function, the applicant of the present application suggests that the flexible printed board be drawn from the optical module in a direction perpendicular to the direction of the optical axis and folded at an outer peripheral side of the optical module to provide a U-shaped folded portion. In addition, it is suggested that the flexible printed board be folded for a plurality of times instead of being folded once in order to reduce the swinging load of the movable body.

However, simply increasing the number of times to fold the flexible printed board, which can merely restrain an increase in a swinging load around an axis parallel with the direction for the flexible printed board to be drawn, cannot restrain an increase in a swinging load around an axis perpendicular to the direction for the flexible printed board to be drawn. Therefore, it is not possible to restrain an increase in a swinging load of a movable body that swings around two axes depending on swinging direction.

In addition, a portion layered by folding the flexible printed board for the plurality of times has a large thickness along a direction of an optical axis and, further, considerably warps up in the direction of the optical axis as a result of swing around an axis perpendicular to the direction for the flexible printed board to be drawn. Accordingly, to prevent collision between the flexible printed board and another member to restrain an increase in the swinging load, it is necessary to increase a height of a space where the flexible printed board is located in the direction of the optical axis. Therefore, it is necessary to increase an installation space for the flexible printed board.

In view of the above, an object of at least an embodiment of the present invention is to restrain an increase in a swinging load due to resistance of a flexible printed board in a case where a movable body with an optical module mounted thereon swings around two axes intersecting each other and to reduce an installation space for the flexible printed board.

SUMMARY

In order to solve the above problems, an optical unit with a shake correction function according to at least an embodiment of the present invention may include a movable body including an optical module; a swing support mechanism to support the movable body swingably around a first axis intersecting an optical axis, and to support the movable body swingably around a second axis intersecting the optical axis and the first axis; a fixation body to support the movable body via the swing support mechanism; a magnetic drive mechanism for swing to cause the movable body to swing around the first axis and around the second axis; and a flexible printed board coupled to the movable body, the flexible printed board including: a fixation portion directly or indirectly fixed to the fixation body; a first portion located between a portion coupled to the movable body and the fixation portion, the first portion extending in a direction of the optical axis along the movable body; and a first folded portion located between the first portion and the fixation portion, the first folded portion extending in a direction intersecting the optical axis and reversely folded.

According to at least an embodiment of the present invention, the flexible printed board coupled to the movable body may include a fixation portion directly or indirectly fixed to the fixation body, and the portion routed between the fixation portion and the movable body includes the first portion extending in the direction of the optical axis and the first folded portion extending in the direction intersecting the optical axis and reversely folded. This makes at least one of the first portion or the first folded portion easily bendable with the swing of the movable body in either direction around the first axis or around the second axis. Thus, it is possible to restrain an increase in a swinging load of the movable body due to resistance of the flexible printed board when the movable body swings in a direction around either one of the first axis and the second axis, which intersect the direction of the optical axis while intersecting each other. Therefore, it is possible to restrain an increase in power consumption.

Moreover, according to at least an embodiment of the present invention, the first portion extending in the direction intersecting the first folded portion may be provided, thus reducing an amount of warpage of the first folded portion in the direction of the optical axis during the swing of the movable body. Therefore, it is possible to reduce an installation space for the flexible printed board.

In at least the embodiment of the present invention, it may be preferable that the first folded portion extends in a direction radially away from a swing center of the movable body and then is reversely folded to extend in a direction radially toward the swing center. This makes a side near the movable body easy to bend to further reduce the resistance of the flexible printed board during the swing of the movable body. Therefore, it is possible to restrain an increase in the swinging load.

In at least the embodiment of the present invention, it may be preferable that the first folded portion is bent in a direction toward a swing center in the direction of the optical axis to be reversely folded. This makes it possible to bring the first folded portion closer to a swing center in the direction of the optical axis. It is thus possible to further reduce the resistance of the flexible printed board during the swing of the movable body around the axis intersecting the optical axis. Therefore, it is possible to restrain an increase in the swinging load.

In at least the embodiment of the present invention, it may be preferable that the first folded portion includes a first extending portion and a second extending portion that overlap as viewed from the direction of the optical axis, and a spacer is located between the first extending portion and the second extending portion. This makes it possible to provide a gap between the first extending portion and the second extending portion. Therefore, it is possible to restrain an increase in the resistance and damage resulting from contact of the flexible printed board with itself.

In at least the embodiment of the present invention, it may be preferable that the flexible printed board includes a plurality of the first folded portions. Here, including a plurality of first folded portions may mean a configuration where a plurality of folded portions folded in the same direction are provided or a configuration where a plurality of folded portions folded in mutually opposite directions are alternately provided. For example, a configuration where the flexible printed board is folded once and then reversely folded once more. This makes it possible to further reduce the resistance of the flexible printed board during the swing of the movable body. Therefore, it is possible to restrain an increase in the swinging load.

In at least the embodiment of the present invention, it may be preferable that the flexible printed board includes a second folded portion extending in the direction of the optical axis and reversely folded once, and the second folded portion includes the first portion. By providing, in addition to the first folded portion, the second folded portion extending in the direction intersecting the first folded portion as above, it is possible to further reduce the resistance of the flexible printed board during the swing of the movable body. Therefore, it is possible to restrain an increase in the swinging load.

Moreover, in this case, it may be preferable that the second folded portion includes a third extending portion and a fourth extending portion that overlap as viewed from a direction perpendicular to the optical axis, and a second spacer is located between the third extending portion and the fourth extending portion. This makes it possible to provide a gap between the third extending portion and the fourth extending portion. Therefore, it is possible to restrain an increase in the resistance and damage resulting from contact of the flexible printed board with itself.

In this case, it may be preferable that the flexible printed board includes a plurality of second folded portions. Here, including a plurality of second folded portions may mean a configuration where a plurality of folded portions folded in the same direction are provided or a configuration where a plurality of folded portions folded in mutually opposite directions are alternately provided. For example, a configuration where the flexible printed board is folded once and then reversely folded once more. This makes it possible to further reduce the resistance of the flexible printed board during the swing of the movable body. Therefore, it is possible to restrain an increase in the swinging load.

In at least the embodiment of the present invention, it may be preferable that the flexible printed board includes a drawn portion drawn from the movable body in the direction intersecting the optical axis, and the second folded portion includes a portion bent to extend from the drawn portion in the direction of the optical axis and at least partly fixed to the movable body. This makes it possible to hold the second folded portion in an attitude extending in the direction of the optical axis. Thus, it is possible to hold the second folded portion in an attitude extending in a direction intersecting the first folded portion to reduce the resistance of the flexible printed board during the swing of the movable body.

In at least the embodiment of the present invention, it may be preferable that the fixation portion is fixed to the fixation body via a third spacer. This makes it possible to provide a gap between the fixation body and the flexible printed board. Therefore, it is possible to restrain an increase in the resistance and damage resulting from contact between the fixation body and the flexible printed board.

In at least the embodiment of the present invention, it may be preferable that the flexible printed board has a slit extending in a direction intersecting a width direction. This makes it possible to further reduce the resistance in bending the flexible printed board. Therefore, it is possible to restrain an increase in the swinging load of the movable body.

In at least the embodiment of the present invention, it may be preferable that the movable body includes a first opposite portion and a second opposite portion spaced from each other in the direction intersecting the optical axis, and the first portion is located between the first opposite portion and the second opposite portion. This makes it possible to restrict a movement range of the first portion and, consequently, restrain an excessive deformation of the flexible printed board.

Alternatively, in at least the embodiment of the present invention, it may be preferable that the movable body includes a first opposite portion and a second opposite portion spaced from each other in the direction intersecting the optical axis, the first portion is located between the first opposite portion and the second opposite portion, the second opposite portion is located at an outer peripheral side of the first opposite portion, and the second opposite portion is located within a range that overlaps the second spacer as viewed from the direction perpendicular to the optical axis. This makes it possible to restrict a movement range of the first portion and, consequently, restrain an excessive deformation of the flexible printed board. In addition, since the second folded portion, except a portion provided with the second spacer, is freely movable without restriction of movement by the second opposite portion, it is possible to reduce the resistance of the flexible printed board during the swing of the movable body. Moreover, since the range where the second opposite portion is provided is small, a reduction in size and weight of the movable body is possible.

In at least the embodiment of the present invention, it may be preferable that the second spacer includes a third reinforcing plate fixed to the third extending portion and a fourth reinforcing plate fixed to the fourth extending portion, the movable body includes a holder surrounding an outer peripheral side of the optical module, the holder has a groove portion to receive an end portion of the third reinforcing plate and an end portion of the fourth reinforcing plate projecting from between the third extending portion and the fourth extending portion, and the groove portion includes a positioning portion to position the third reinforcing plate and the fourth reinforcing plate in the direction of the optical axis. This makes it possible to position the third reinforcing plate and the fourth reinforcing plate in the direction of the optical axis and a direction intersecting the direction of the optical axis. In addition, by positioning the third reinforcing plate and the fourth reinforcing plate in the direction of the optical axis, it is possible to position the third extending portion and the fourth extending portion in the direction of the optical axis. Therefore, it is possible to restrain variation in a folded position of the second folded portion and, consequently, restrain variation in the position of the flexible printed board, which is routed between the second folded portion and the fixation portion, in the direction of the optical axis.

In at least the embodiment of the present invention, it may be preferable that the groove portion includes a reinforcing plate holding portion where the end portion of the third reinforcing plate and the end portion of the fourth reinforcing plate are to be fitted and a leading portion with a groove width increased toward a side opposite to the reinforcing plate holding portion. This makes it possible to insert the third reinforcing plate and the fourth reinforcing plate into the leading portion while folding the second folded portion. In addition, by inserting the third reinforcing plate and the fourth reinforcing plate into the reinforcing plate holding portion through the leading portion, it is possible to fully fold the second folded portion. Therefore, the second folded portion can be easily folded and the second folded portion can be easily positioned.

In at least the embodiment of the present invention, it may be preferable that the end portion of the third reinforcing plate and the end portion of the fourth reinforcing plate are pressed in the reinforcing plate holding portion. This makes it possible to restrain variation in positions of the third reinforcing plate and the fourth reinforcing plate in the direction intersecting the direction of the optical axis and restrain variation in a position of the second folded portion in the direction intersecting the direction of the optical axis. In addition, since the third reinforcing plate and the fourth reinforcing plate can be held in the groove portion, it is possible to restrain deviation of the position of the second folded portion.

In at least the embodiment of the present invention, it may be preferable that the flexible printed board includes a bent portion having the first portion and a second portion, the second portion bent from the first portion in the direction intersecting the optical axis, and a shape retaining component to retain a shape of the bent portion is fixed to the bent portion. This makes it possible to prevent the bent portion from opening over time and, consequently, restrain a change in an initial attitude of the movable body with a change in the shape of the flexible printed board over time. Thus, it is possible to restrain an adverse influence on characteristics of the optical unit with a shake correction function. In addition, it is not necessary to plastically deform the flexible board to prevent the bent portion from opening, so that damage at the bent position can be reduced. Therefore, it is possible to reduce fatigue breakage of wirings on the board resulting from a bending process.

In at least the embodiment of the present invention, it may be preferable that the shape retaining component includes a bent plate including a first plate portion fixed to the first portion and a second plate portion extending in a direction intersecting the first plate portion and fixed to the second portion. This makes it possible to reduce the size of the shape retaining component for a small installation space. Therefore, it is possible to restrain the shape retaining component from interfering with the movable body or the fixation body.

In at least the embodiment of the present invention, it may be preferable that the bent plate has a first cut portion provided in the first plate portion at each of both ends of an edge opposite to the second plate portion and a second cut portion provided in the second plate portion at each of both ends of an edge opposite to the first plate portion. This makes it possible to restrain an increase in a spring constant of the flexible printed board resulting from the bent plate being attached. Therefore, it is possible to restrain an adverse influence on shake correction.

In at least the embodiment of the present invention, it may be preferable that the bent plate has an opening portion. This makes it possible to reduce a weight of the bent plate. In addition, the opening portion is usable as an adhesive reservoir.

In at least the embodiment of the present invention, it may be preferable that the bent plate is located inside the bent portion. This makes it possible to locate the bent plate opposite the movable body and, consequently, restrain the bent plate from interfering with the movable body.

Next, at least an embodiment of the present invention provides a method of producing the optical unit with a shake correction function includes: fixing, before the second folded portion is folded, a third reinforcing plate to a portion corresponding to the third extending portion and a fourth reinforcing plate to a portion corresponding to the fourth extending portion in the flexible printed board; and folding the second folded portion at a predetermined bent position by bringing the third reinforcing plate and the fourth reinforcing plate into contact with each other in the direction intersecting the optical axis to align positions of the third reinforcing plate and the fourth reinforcing plate in the direction of the optical axis with each other. Using the third reinforcing plate and the fourth reinforcing plate as above makes it possible to easily fold the second folded portion at a predetermined folded position with accuracy. In addition, since the third reinforcing plate and the fourth reinforcing plate are each usable as the second spacer, it is possible to easily locate the second spacer between the third extending portion and the fourth extending portion.

In at least the embodiment of the present invention, it may be preferable that the movable body includes a holder surrounding an outer peripheral side of the optical module and the positions of the third reinforcing plate and the fourth reinforcing plate in the direction of the optical axis are aligned, by inserting an end portion of the third reinforcing plate and an end portion of the fourth reinforcing plate in a groove portion provided in the holder and bringing the end portion of the third reinforcing plate and the end portion of the fourth reinforcing plate into abutment with a positioning portion provided in the groove portion. This makes it possible to easily align the positions of the third reinforcing plate and the fourth reinforcing plate in the direction of the optical axis. In addition, the third reinforcing plate and the fourth reinforcing plate can be held in the groove portion to hold the second folded portion in a folded shape.

In at least the embodiment of the present invention, it is preferable that the method may further include putting an adhesive in the groove portion after the end portion of the third reinforcing plate and the end portion of the fourth reinforcing plate are inserted in the groove portion to align the positions of the third reinforcing plate and the fourth reinforcing plate in the direction of the optical axis. This makes it possible to fix the third reinforcing plate and the fourth reinforcing plate to the groove portion. Therefore, it is possible to prevent or restrain detachment of the second folded portion from the groove portion and, consequently, prevent or restrain deviation of the position of the second folded portion.

According to at least the embodiment of the present invention, the flexible printed board coupled to the movable body may include a fixation portion directly or indirectly fixed to the fixation body, and the portion routed between the fixation portion and the movable body includes the first portion extending in the direction of the optical axis and the first folded portion extending in the direction intersecting the optical axis and reversely folded. This makes at least one of the first portion or the first folded portion easily bendable with the swing of the movable body in either direction around the first axis or around the second axis. This makes it possible to restrain an increase in the swinging load of the movable body due to the resistance of the flexible printed board when the movable body swings in a direction around either one of the first axis and the second axis, which intersect the direction of the optical axis. Therefore, it is possible to restrain an increase in power consumption. Moreover, in addition to the first folded portion, the first portion extending in the direction intersecting the first folded portion is provided, thus reducing the amount of the warpage of the first folded portion in the direction of the optical axis with the swing of the movable body. Therefore, it is possible to reduce the installation space for the flexible printed board.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Description will be made below on an embodiment of an optical unit 1 with a shake correction function to which at least an embodiment of the present invention is applied with reference to the drawings. Herein, three XYZ axes are perpendicular to each other. +X denotes one side in an X-axis direction and −X denotes the other side, +Y denotes one side in a Y-axis direction and −Y denotes the other side, and +Z denotes one side in a Z-axis direction and −Z denotes the other side. The Z-axis direction is aligned with a direction of an optical axis L of an optical module 2. In addition, a −Z direction corresponds to a rear side (image side) in the direction of the optical axis L and a +Z direction corresponds to a front side (object side) in the direction of the optical axis L.

Overall Configuration

Figure 1:
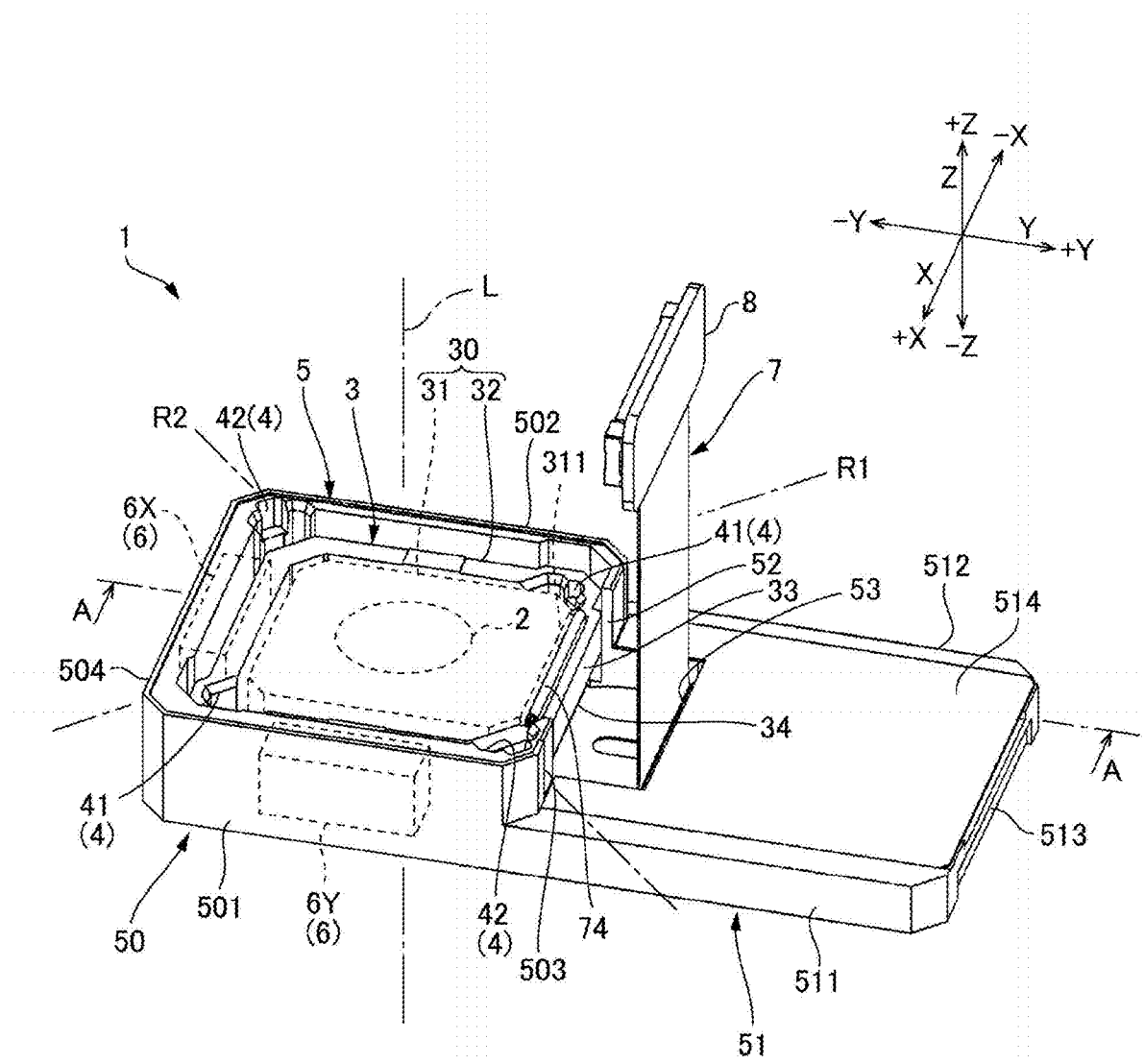
FIG. 1 is a perspective view of an optical unit with a shake correction function to which at least an embodiment of the present invention is applied.
Figure 2:
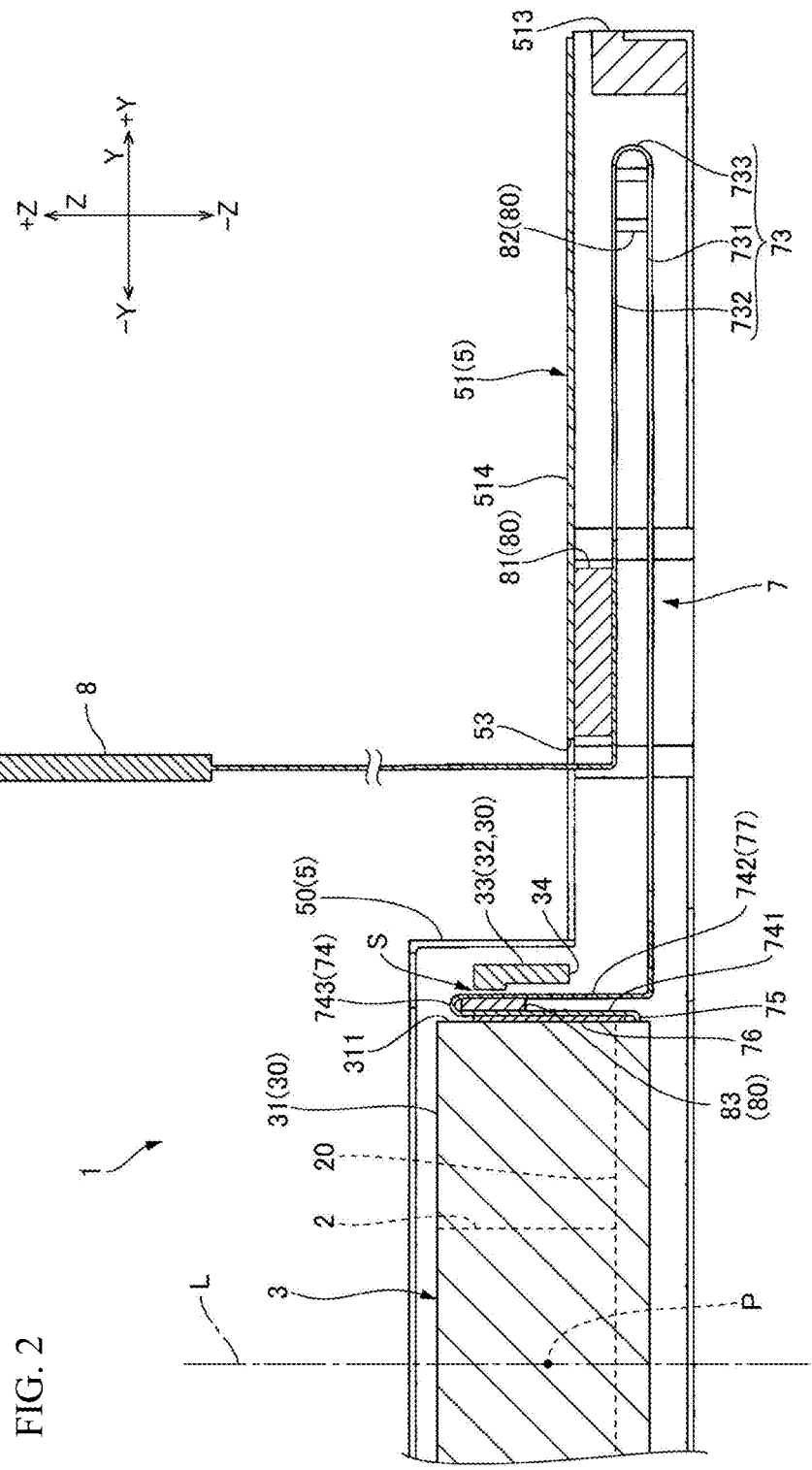
FIG. 2 is a partial cross-sectional view of the optical unit with a shake correction function of FIG. 1 (a partial cross-sectional view at an A-A position in FIG. 1)

FIG. 1 is a perspective view of the optical unit 1 with a shake correction function to which at least the embodiment of the present invention is applied. FIG. 2 is a partial cross-sectional view of the optical unit 1 with a shake correction function of FIG. 1 (a partial cross-sectional view at an A-A position in FIG. 1). The optical unit 1 with a shake correction function includes the optical module 2 including an optical element such as a lens. For example, the optical unit 1 with a shake correction function is used as an optical device such as a camera-equipped mobile phone or a dashboard camera or an optical device, such as an action camera or a wearable camera, mounted on a moving body such as a helmet, a bicycle, or a radio control helicopter. In such optical devices, shake of the optical device occurring during shooting causes disturbance in a captured image. To prevent the captured image from being inclined, the optical unit 1 with a shake correction function corrects an inclination of the optical module 2 on the basis of an acceleration, a rotation speed, a shake amount, or the like detected by a detector such as a gyroscope.

The optical unit 1 with a shake correction function includes a movable body 3 where the optical module 2 is mounted, a swing support mechanism 4 supporting the movable body 3 while allowing the movable body 3 to swing, a fixation body 5 supporting the movable body 3 via the swing support mechanism 4, a magnetic drive mechanism 6 for swing that causes the movable body 3 to swing with respect to the fixation body 5, and a flexible printed board 7 coupled to the movable body 3. The flexible printed board 7 is provided with a connector portion 8 for coupling to an external device at an end portion opposite to a side coupled to the movable body 3. The end portion provided with the connector portion 8 is drawn from the fixation body 5 toward a front side (+Z direction) in the direction of the optical axis L.

The optical unit 1 with a shake correction function corrects shake by swinging the movable body 3 around two axes (X axis and Y axis) that intersect the optical axis L (Z axis) while intersecting each other. The shake correction around the X axis and the shake correction around the Y axis allow for correction of shake in a pitching (vertical shake) direction and correction of shake in a yawing (horizontal shake) direction.

Swing Support Mechanism

By the swing support mechanism 4, the movable body 3 is supported swingably around a first axis R1 perpendicular to the optical axis L (Z axis) while supported swingably around a second axis R2 perpendicular to the optical axis L and the first axis R1. The first axis R1 and the second axis R2 are each inclined with respect to each of the X axis and the Y axis by 45 degrees. A rotation around the first axis R1 and a rotation around the second axis R2 are synthesized, thereby allowing the movable body 3 to swing around the X axis and the Y axis. The movable body 3 is thus supported swingably around the X axis and the Y axis by the swing support mechanism 4.

The swing support mechanism 4 includes a first swing support portion 41 provided at diagonal positions on the first axis R1 in the movable body 3, a second swing support portion 42 provided at diagonal positions on the second axis R2 in the fixation body 5, and a movable frame (not shown). The movable frame, which is, for example, a leaf spring, has two pivot points provided at the diagonal positions on the first axis R1 and two pivot points provided at the diagonal positions on the second axis R2. By providing these four pivot points in the first swing support portion 41 and the second swing support portion 42, the movable body 3 is, via the movable frame, supported swingably around the first axis R1 while supported swingably around the second axis R2. A swing center P of the movable body 3 corresponds to an intersection between the first axis R1 and the second axis R2.

Magnetic Drive Mechanism for Swing magnetic drive mechanism 6 for swing includes a first magnetic drive mechanism 6X that causes the movable body 3 to rotate around the X axis and a second magnetic drive mechanism 6Y that causes the movable body 3 to rotate around the Y axis. The first magnetic drive mechanism 6X and the second magnetic drive mechanism 6Y each include a magnet attached to the movable body 3 and a coil attached to the fixation body 5. The coil and the magnet of the first magnetic drive mechanism 6X face each other in the Y-axis direction and the coil and the magnet of the second magnetic drive mechanism 6Y face each other in the X-axis direction. The first magnetic drive mechanism 6X generates a magnetic driving force around the X axis when the coil is energized. The second magnetic drive mechanism 6Y generates a magnetic driving force around the Y axis when the coil is energized.

Fixation Body

The fixation body 5 includes an outer frame portion 50 surrounding the movable body 3 and a wiring housing portion 51 projecting from a portion of the outer frame portion 50 at a rear side (−Z direction) n the direction of the optical axis L toward an outer peripheral side. In the present embodiment, the outer frame portion 50 is in a rectangular shape when viewed from the direction of the optical axis L with the wiring housing portion 51 projecting from the outer frame portion 50 in the +Y direction. The outer frame portion 50 and the wiring housing portion 51 have substantially the same width in the X-axis direction. The outer frame portion 50 includes side wall portions 501 and 502 opposite to each other in the X-axis direction and side wall portions 503 and 504 opposite to each other in the Y-axis direction. The outer frame portion 50 has an opening portion 52 provided by cutting an X-axis-direction middle portion of the +Y-direction side wall portion 503. The opening portion 52 faces the wiring housing portion 51.

The flexible printed board 7 is drawn toward a +Y-direction side of the movable body 3, which is located inside the outer frame portion 50, extending inside the wiring housing portion 51 through the opening portion 52. The wiring housing portion 51 includes frame portions 511 and 512 extending in the +Y direction respectively from the side wall portions 501 and 502 at both X-axis-direction sides of the outer frame portion 50, a frame portion 513 extending in the X-axis direction from a +Y-direction end portion of the frame portion 511 to a +Y-direction end portion of the frame portion 512, and an upper plate portion 514 covering a space surrounded by the frame portions 511, 512, and 513 from the +Z direction. The upper plate portion 514 has a rectangular cut portion 53 provided by cutting a −Y-direction edge in the +Y direction with the same width as a width of the opening portion 52. After routed inside the wiring housing portion 51, the flexible printed board 7 is bent toward the front side (+Z direction) in the direction of the optical axis L to be drawn out of the wiring housing portion 51 through the cut portion 53.

Movable Body

The movable body 3 includes the optical module 2 and a holder 30 that holds the optical module 2. The first swing support portion 41 of the swing support mechanism 4 is provided at diagonal positions on the first axis R1 in the holder 30. The holder 30 includes an inner holder 31 provided with a holding hole where the optical module 2 is located and a frame-shaped outer holder 32 surrounding the inner holder 31. The inner holder 31 is fixed to the outer holder 32 and the first swing support portion 41 is provided to the outer holder 32.

The outer holder 32 includes a first frame portion 33 located in the +Y direction relative to the inner holder 31. A portion of the outer holder 32 surrounding the inner holder 31 from the three directions such as the −Y direction, the +X direction, and the −X direction is in contact with the inner holder 31. Meanwhile, the first frame portion 33 of the outer holder 32 has an X-axis-direction middle portion projecting in the +Y direction with a gap S formed between the first frame portion 33 and a +Y-direction side surface 311 of the inner holder 31 (see FIG. 2). As described later, a folded portion of the flexible printed board 7 is located in the gap S between the side surface 311 of the inner holder 31 and the first frame portion 33.

The outer holder 32 includes a cut portion 34 provided by cutting a portion of the first frame portion 33 at a rear side (−Z direction) in the direction of the optical axis L. The flexible printed board 7 is bent in the +Y direction inside the first frame portion 33, extending to the wiring housing portion 51 through the cut portion 34.

Flexible Printed Board

Figure 3:
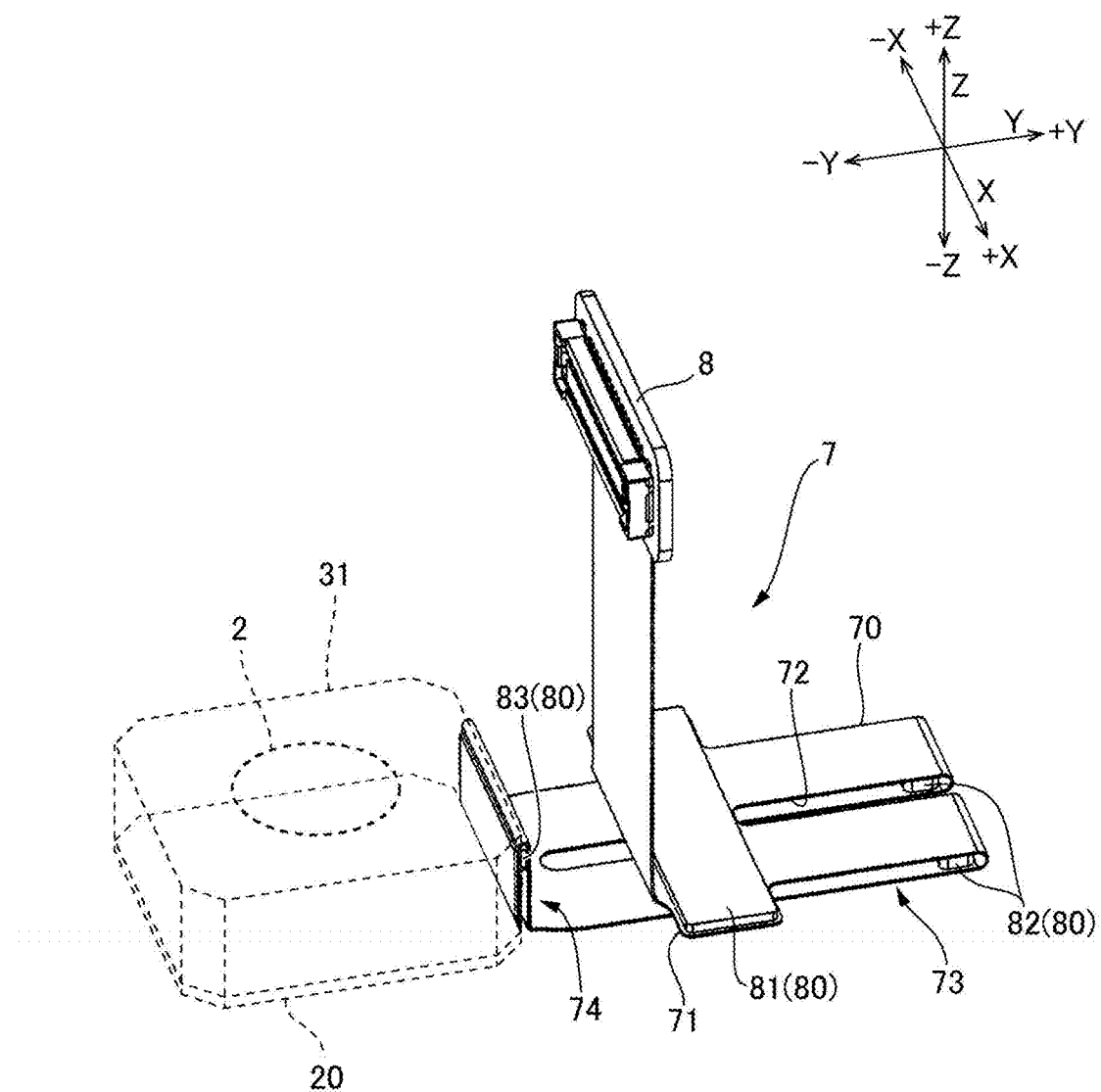
FIG. 3 is a perspective view of a flexible printed board.
Figure 4A:
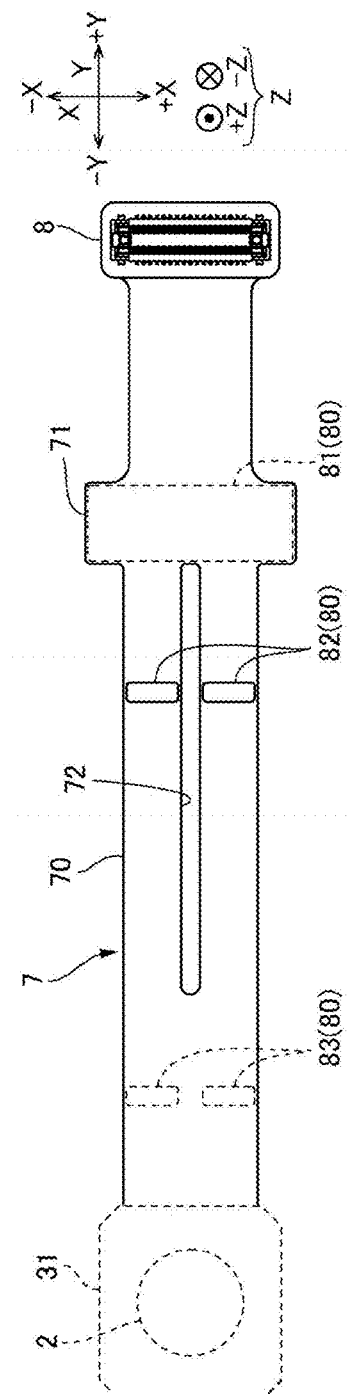
FIGS. 4A, 4B, and 4C are each a development view of the unassembled flexible printed board.
Figure 4B:
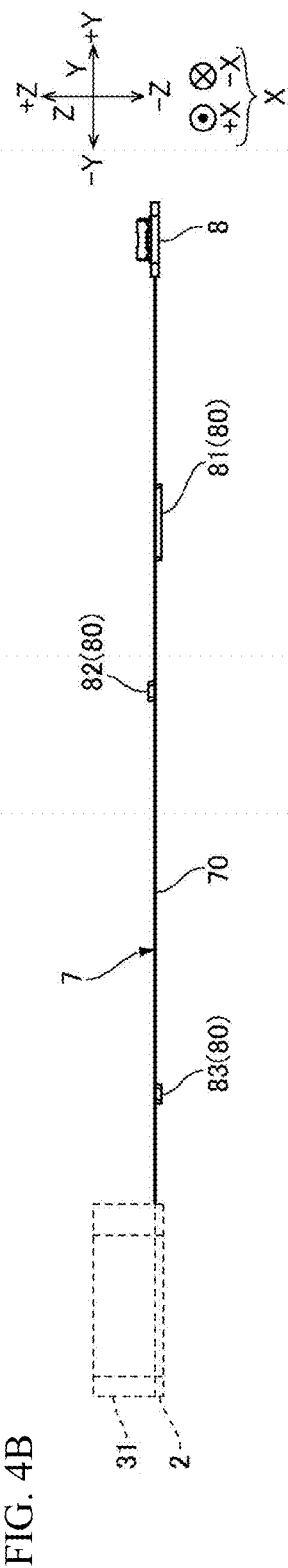
Figure 4C:
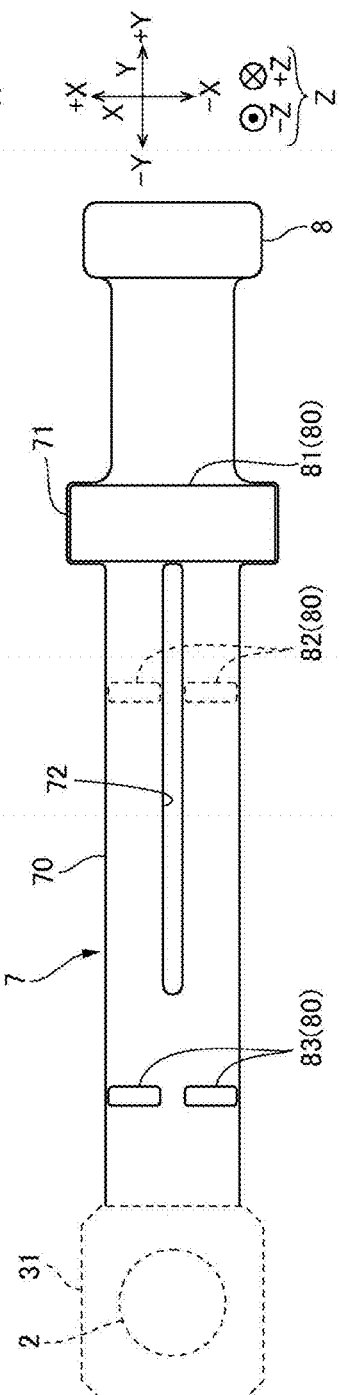

FIG. 3 is a perspective view of the flexible printed board 7 and FIGS. 4A, 4B, and 4C are each a development view of the unassembled flexible printed board 7. FIG. 4A is a plan view of the flexible printed board 7 as viewed from the front side (+Z direction) in the direction of the optical axis L, FIG. 4B is a side view of the flexible printed board 7, and FIG. 4C is a bottom view of the flexible printed board 7 as viewed from the rear side (−Z direction) in the direction of the optical axis L. In FIGS. 3 and 4A to 4C, a schematic shape of each of an optical module substrate 20, which is coupled to an end portion of the flexible printed board 7, and the inner holder 31, to which the optical module substrate 20 is fixed, is represented by dashed lines. The movable body 3 includes the optical module substrate 20, on which an image-capturing element, a signal processing circuit, etc. of the optical module 2 are implemented and the flexible printed board 7 is coupled to the optical module substrate 20. The flexible printed board 7 includes a power supply line to the optical module 2 and a signal line for taking out a signal from the optical module 2.

As shown in FIGS. 4A, 4B, and 4C, the unassembled flexible printed board 7 linearly extends. The flexible printed board 7 includes a flexible board 70, a connector portion 8 provided at a longitudinal end portion of the flexible board 70, and a reinforcing plate 80 fixed to the flexible board 70. The flexible board 70 includes a widened portion 71 provided at a position offset from a longitudinal center toward the connector portion 8, and a slit 72 extending in a direction perpendicular to a width direction at a width-direction center of a region at an optical module substrate 20 side (movable body 3 side) relative to the widened portion 71. The slit 72 is a penetrating portion penetrating the flexible board 70. The flexible board 70 is thus divided into two narrow flexible board parts in a range where the slit 72 is provided.

The reinforcing plate 80 includes a first reinforcing plate 81 fixed to the widened portion 71, two second reinforcing plates 82 fixed at both width-direction sides of the slit 72, and two third reinforcing plates 83 each fixed at a position closer to the optical module substrate 20 (closer to the movable body 3) than a position of the slit 72. The third reinforcing plates 83 are arranged side by side in a width direction of the flexible board 70 similarly to the second reinforcing plates 82. The reinforcing plate 80 functions as a spacer for preventing contact of the flexible board 70 with itself or contact of the flexible board 70 with another member as described later.

As shown in FIGS. 2 and 3, the assembled flexible printed board 7 has a shape where the flexible printed board 7 is bent to be within the wiring housing portion 51 in the +Y direction relative to the movable body 3 and then drawn toward the front side (+Z direction) in the direction of the optical axis L through the cut portion 53 of the wiring housing portion 51. In the present embodiment, the assembled flexible printed board 7 has a shape where the flexible printed board 7 has two folded portions extending in directions intersecting each other. One of the two folded portions refers to a first folded portion 73 extending in a direction (Y-axis direction) intersecting the optical axis L and the other refers to a second folded portion 74 extending in the direction of the optical axis L.

In the embodiment, the first folded portion 73 extends in a direction (Y-axis direction) along an imaginary plane (XY plane) including the X axis (first axis) and the Y axis (second axis), that is, swing axes of the movable body 3, extending in a direction perpendicular to the optical axis L. Moreover, after extending in a direction (+Y direction) radially away from the swing center P of the movable body 3, the first folded portion 73 is bent toward the front side (+Z direction) in the direction of the optical axis L and reversely folded, extending in a direction (−Y direction) radially toward the swing center P. The first folded portion 73, which is located at a rear side (−Z direction) in the direction of the optical axis L with respect to the swing center P of the movable body 3, extends in a direction (+Y direction) radially away from the swing center of the movable body 3 and is then bent in a direction (+Z direction) toward the swing center P in the direction of the optical axis L to be reversely folded.

The flexible printed board 7 is bent substantially at a right angle immediately after drawn from the movable body 3 in the +Y direction, extending in the direction of the optical axis L along the movable body 3 and then being folded. That is, the second folded portion 74 is located at a position where the flexible printed board 7 reaches immediately after drawn from the movable body 3. The second folded portion 74 is provided by folding a portion of the flexible printed board 7 closer to the optical module substrate 20 (closer to the movable body 3) than the slit 72.

Moreover, the flexible printed board 7, which is bent substantially at a right angle from the second folded portion 74 and extends in the +Y direction, extends to a vicinity of the frame portion 513 located at a +Y-direction end portion of the wiring housing portion 51 and is then folded to provide the first folded portion 73. The first folded portion 73 is formed by folding a portion provided with the slit 72.

The widened portion 71 of the flexible printed board 7, which is located at a −Y-direction side relative to the first folded portion 73, is fixed to the upper plate portion 514 of the wiring housing portion 51 with the first reinforcing plate 81 in between. That is, the widened portion 71 of the flexible printed board 7 is a part that functions as a fixation portion to be fixed to the fixation body 5. Meanwhile, the upper plate portion 514 of the wiring housing portion 51 is a part that functions as a fixation surface where the flexible printed board 7 is to be fixed. The first reinforcing plate 81 functions as a spacer (third spacer) for preventing contact between the flexible printed board 7 and the upper plate portion 514. The flexible printed board 7 is bent substantially at a right angle at a −Y-direction side relative to the widened portion 71 (fixation portion), being drawn through the cut portion 53 of the wiring housing portion 51 toward a front side (+Z) in the direction of the optical axis L.

The first folded portion 73 includes: a first extending portion 731 and a second extending portion 732 extending in the Y direction; and a first curved portion 733 bent from the first extending portion 731 toward the front side (+Z direction) in the direction of the optical axis L and extending in a reversely bent shape to be continuous with the second extending portion 732. The first extending portion 731 and the second extending portion 732 overlap as viewed from the direction of the optical axis L (i.e., a direction perpendicular to the XY plane). The second reinforcing plate 82, which is located between the first extending portion 731 and the second extending portion 732, functions as a spacer (first spacer) for preventing contact between the first extending portion 731 and the second extending portion 732. The second reinforcing plate 82 is located at a position closest to the first curved portion 733 (a furthest +Y-direction position) between the first extending portion 731 and the second extending portion 732.

The second folded portion 74 includes: a third extending portion 741 and a fourth extending portion 742 extending in the direction of the optical axis L; and a second curved portion 743 extending in a shape reversely bent from the third extending portion 741 to be continuous with the fourth extending portion 742. The third extending portion 741 and the fourth extending portion 742 overlap as viewed from the direction of the Y direction (i.e., a direction perpendicular to the optical axis L). The third reinforcing plate 83, which is located between the third extending portion 741 and the fourth extending portion 742, functions as a spacer (second spacer) for preventing contact between the third extending portion 741 and the fourth extending portion 742. The third reinforcing plate 83 is located at a position closest to the second curved portion 743 (a furthest +Z-direction position) between the third extending portion 741 and the fourth extending portion 742.

Figure 5:
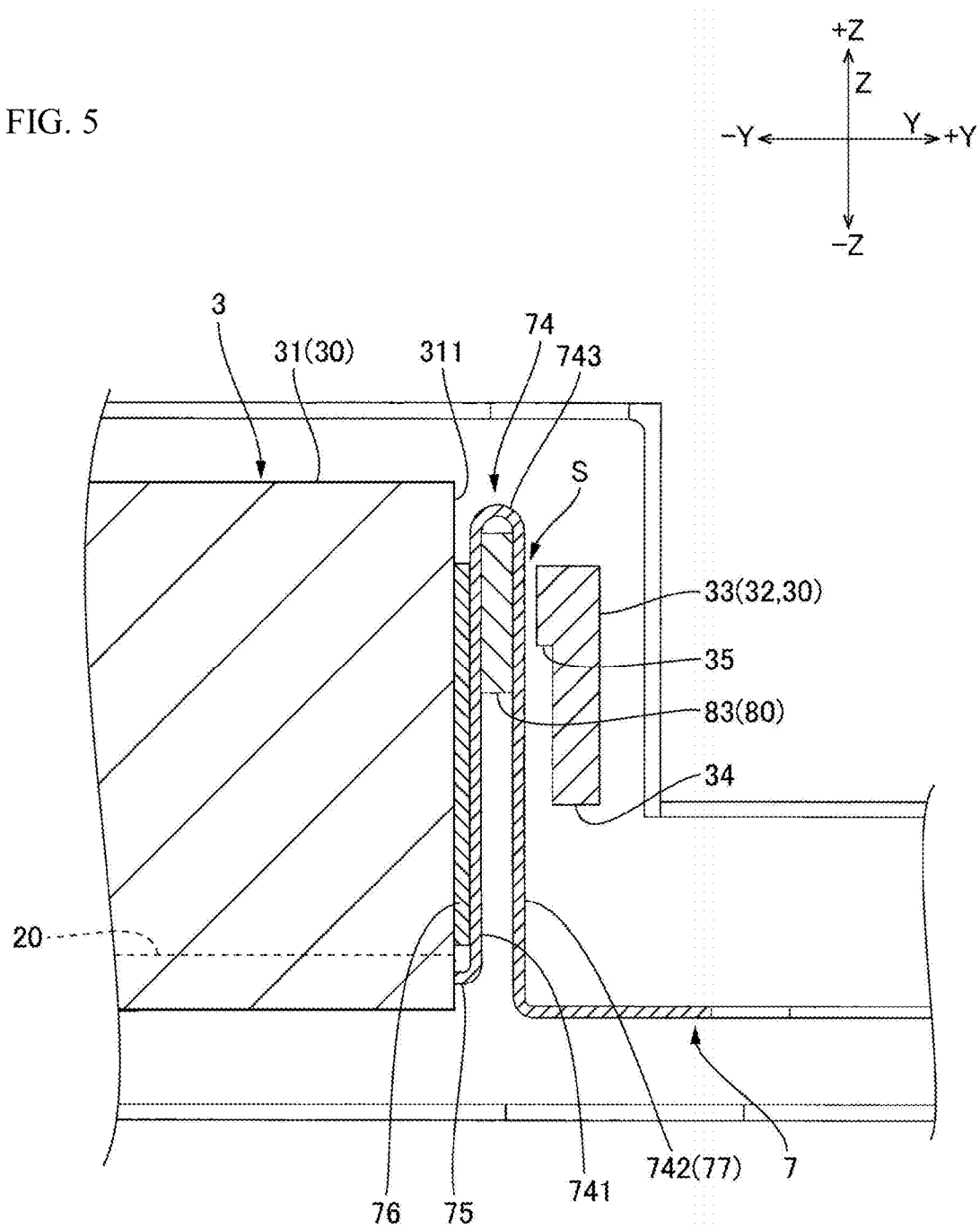
FIG. 5 is a partial cross-sectional view showing a retaining structure of a second folded portion.

FIG. 5 is a partial cross-sectional view showing a retaining structure of the second folded portion 74. The flexible printed board 7 includes a drawn portion 75 drawn in the +Y direction from the movable body 3. A portion of the second folded portion 74 bent to extend in the direction of the optical axis L from the drawn portion 75 is fixed to the movable body 3. In the present embodiment, the third extending portion 741 of the second folded portion 74 is bent to extend from the drawn portion 75 toward the front side (+Z direction) in the direction of the optical axis L and fixed to the +Y-direction side surface 311 of the inner holder 31. The third extending portion 741 is fixed to the side surface 311 with a double-sided tape 76. The double-sided tape 76 extends from a vicinity of the drawn portion 75 to a vicinity of the second curved portion 743, fixing a majority of the third extending portion 741 to the side surface 311.

It is to be noted that the third extending portion 741 may be fixed by any fixing method other than the double-sided tape 76. For example, the third extending portion 741 may be fixed with an adhesive. In addition, it is sufficient to fix at least part of the third extending portion 741 to the side surface 311. For example, only a part near the drawn portion 75 may be fixed to the side surface 311 while the other part is freely movable.

The second folded portion 74 includes a first portion 77 that is easily deformable with swing of the movable body 3 around the X axis. In the present embodiment, since the third extending portion 741 is fixed to the side surface 311 of the movable body 3, the fourth extending portion 742 functions as the first portion 77. The first portion 77 extends in the direction of the optical axis L.

The movable body 3 includes a first opposite portion and a second opposite portion that are opposite each other in a direction intersecting the optical axis L and the second folded portion 74 is located between the first opposite portion and the second opposite portion. In the present embodiment, the first opposite portion is provided in the inner holder 31 of the movable body 3 and the second opposite portion is provided in the outer holder 32 of the movable body 3. As described above, the outer holder 32 includes a first frame portion 33 opposite to the +Y-direction side surface 311 of the inner holder 31 with the gap S in between. The first frame portion 33 includes a projecting portion 35 that projects toward the inner holder 31 (−Y direction) with a distal end of the projecting portion 35 being opposite to the side surface 311 of the inner holder 31 in the Y-axis direction. That is, the side surface 311 of the inner holder 31 corresponds to the first opposite portion and the projecting portion 35 of the first frame portion 33 corresponds to the second opposite portion.

The second folded portion 74 is located in the gap S between the side surface 311 of the inner holder 31 and the projecting portion 35 of the first frame portion 33. The first frame portion 33 is located at an outer peripheral side of the second folded portion 74, thereby causing the first frame portion 33 to restrict the second folded portion 74 from being deformed before the second folded portion 74 comes into contact with the outer frame portion 50 of the fixation body 5 with the swing of the movable body 3. As shown in FIG. 5, the projecting portion 35 is located within a range overlapping the third reinforcing plate 83 as viewed from the direction (Y-axis direction) perpendicular to the optical axis L. That is, a part of the second folded portion 74 restricted from being deformed by the projecting portion 35 is merely a part provided with the third reinforcing plate 83.

Figure 6A:
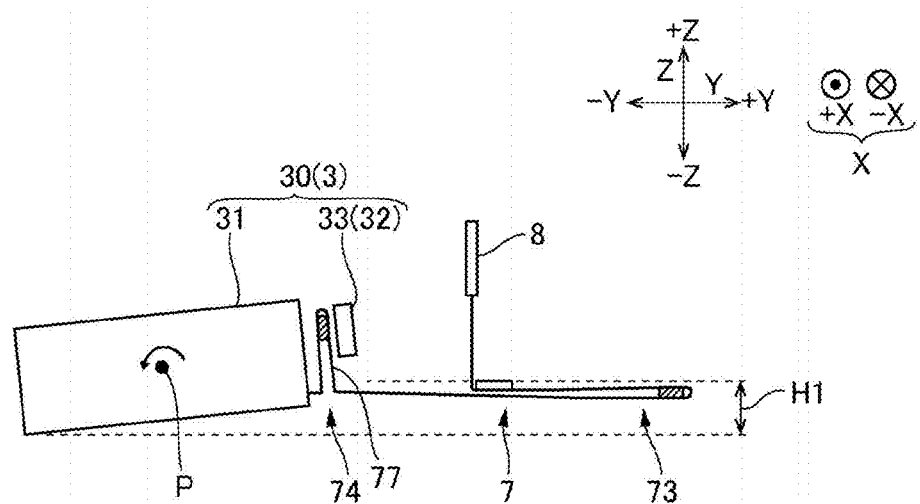
FIGS. 6A and 6B are each an explanatory diagram of an installation space for the flexible printed board to which at least the embodiment of the present invention is applied.
Figure 6B:
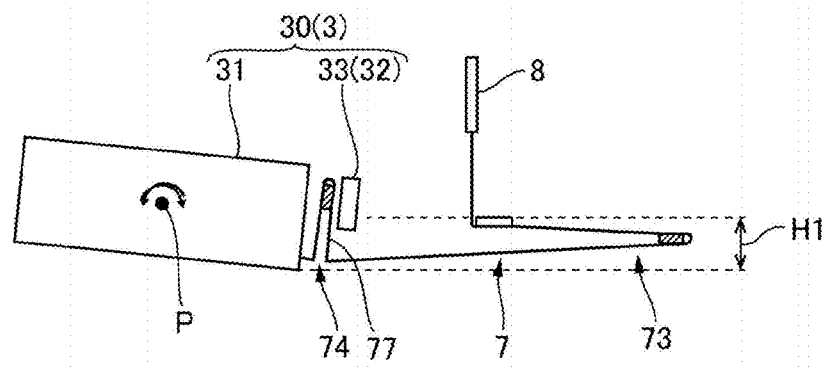
Figure 7:
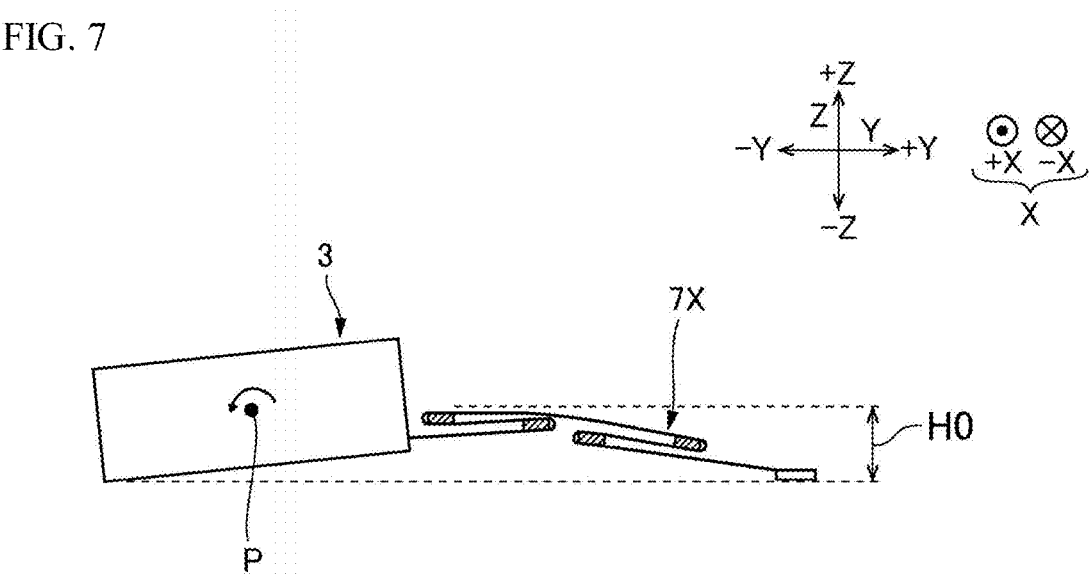
FIG. 7 is an explanatory diagram of an installation space for a flexible printed board according to a comparative example.

FIGS. 6A and 6B are each an explanatory diagram of an installation space for the flexible printed board 7 to which at least the embodiment of the present invention is applied. FIG. 6A shows a shape of the flexible printed board 7 resulting from the movable body 3 swinging in one direction around the X axis and FIG. 6B shows a shape of the flexible printed board 7 resulting from the movable body 3 swinging in the other direction around the X axis. FIG. 7 is an explanatory diagram of an installation space for a flexible printed board 7X according to a comparative example. The flexible printed board 7X according to the comparative example has a shape where a folded portion extending in the Y-axis direction is layered in a plurality of tiers and includes no folded portion extending in the direction of the optical axis L.

As shown in FIG. 7, the flexible printed board 7X according to the comparative example considerably warps with the swing of the movable body 3 around the X axis, so that it is necessary to increase a height H0 of the installation space in the direction of the optical axis L. In contrast, the flexible printed board 7 according to the present embodiment includes the second folded portion 74 extending in the direction of the optical axis L and easily deformable with the swing of the movable body 3 around the X axis as shown in FIGS. 6A and 6B, thus reducing an amount of warpage of the first folded portion 73. For this reason, a height H1 of the installation space in the direction of the optical axis L is smaller than the height H0 of the installation space according to the comparative example. The present embodiment thus makes it possible to reduce the height of the installation space for the flexible printed board 7 in the direction of the optical axis L as compared with the comparative example.

Main Operations and Effects of the Present Embodiment

As described above, the optical unit with a shake correction function according to the present embodiment includes: the movable body 3 including the optical module 2; the swing support mechanism 4 that supports the movable body 3 swingably around the first axis (X axis) intersecting the optical axis L while supporting the movable body 3 swingably around the second axis (Y axis) intersecting the optical axis L and the first axis (X axis); the fixation body 5 that supports the movable body 3 via the swing support mechanism 4; the magnetic drive mechanism 6 for swing that causes the movable body 3 to swing around the first axis (X axis) and the second axis (Y axis); and the flexible printed board 7 coupled to the movable body 3. The flexible printed board 7 includes the widened portion 71 fixed to the fixation body 5, the first portion 77 located between a portion coupled to the movable body 3 and the widened portion 71; and the first folded portion 73 located between the first portion 77 and the widened portion 71. The first portion 77 extends in the direction of the optical axis L and the first folded portion 73 extends in the direction (Y-axis direction) intersecting the optical axis L and is reversely folded.

In the present embodiment, the flexible printed board 7, which is coupled to the movable body 3, includes the first portion 77 extending in the direction of the optical axis L and the first folded portion 73 extending in the direction (Y-axis direction) intersecting the optical axis L as described above. The first portion 77 is easily deformable with the swing of the movable body 3 around the X axis. Thus, at least one of the first portion 77 or the first folded portion 73 is easily bendable with the swing of the movable body 3 in either direction around the first axis (X axis) or around the second axis (Y axis). Therefore, it is possible to restrain an increase in the swinging load of the movable body 3 due to the resistance of the flexible printed board 7 when the movable body 3 swings in either direction around the X axis or around the Y axis.

Moreover, in the present embodiment, the first portion 77, which extends in the direction intersecting the first folded portion 73, reduces the amount of the warpage of the first folded portion 73 in the direction of the optical axis L during the swing of the movable body 3. Therefore, it is possible to reduce the installation space for the flexible printed board 7.

In the present embodiment, the first folded portion 73 is reversely folded after extending in the direction radially away from the swing center P of the movable body 3 (+Y direction), extending in the direction radially toward the swing center P of the movable body 3 (−Y direction). The side near the movable body 3 is thus easy to bend, making it possible to further reduce the resistance of the flexible printed board 7 during the swing of the movable body 3. Therefore, it is possible to restrain an increase in the swinging load. In addition, the first folded portion 73 is bent in the direction toward the swing center P of the movable body 3 in the direction of the optical axis L, being reversely folded. Thus, as being bent in the direction toward the swing center P in the direction of the optical axis L to be reversely folded, the first folded portion 73 can be brought closer to the swing center P in the direction of the optical axis L. This makes it possible to further reduce the resistance of the flexible printed board 7 during the swing of the movable body 3 around the axis intersecting the optical axis L. Therefore, it is possible to restrain an increase in the swinging load.

In the present embodiment, the first folded portion 73 includes the first extending portion 731 and the second extending portion 732 overlapping as viewed from the direction of the optical axis L and the second reinforcing plate 82, which functions as the spacer (first spacer), is located between the first extending portion 731 and the second extending portion 732. Thus, it is possible to provide the gap between the first extending portion 731 and the second extending portion 732 and, consequently, restrain an increase in resistance and damage resulting from contact of the flexible board 70 with itself.

In the present embodiment, the flexible printed board 7 includes the second folded portion 74 extending in the direction of the optical axis L along the movable body 3 and reversely folded once and the second folded portion 74 includes the first portion 77 (fourth extending portion 742) easily deformable with the swing of the movable body 3 around the X axis. Thus, as the second folded portion 74 is provided by folding once the portion extending in the direction of the optical axis L, it is possible to further reduce the resistance of the flexible printed board 7 during the swing of the movable body 3. Therefore, it is possible to restrain an increase in the swinging load.

In the present embodiment, the second folded portion 74 includes the third extending portion 741 and the fourth extending portion 742 overlapping as viewed from the direction (Y-axis direction) perpendicular to the optical axis L and the third reinforcing plate 83, which functions as the spacer (second spacer), is located between the third extending portion 741 and the fourth extending portion 742. Thus, it is possible to provide the gap between the third extending portion 741 and the fourth extending portion 742 and, consequently, restrain an increase in resistance and damage resulting from contact of the flexible board 70 with itself.

In the present embodiment, the flexible printed board 7 includes the drawn portion 75 drawn from the movable body 3 in the +Y direction, and the second folded portion 74 includes the third extending portion 741 bent to extend from the drawn portion 75 in the direction of the optical axis L and at least partly fixed to the movable body 3. Fixing the third extending portion 741 to the movable body 3 makes it possible to hold the second folded portion 74 in an attitude extending in the direction of the optical axis L. Thus, it is possible to restrain an increase in the resistance of the flexible printed board 7 during the swing of the movable body 3 around the X axis.

In the present embodiment, the widened portion 71 of the flexible printed board 7 is fixed to the upper plate portion 514 of the wiring housing portion 51 with the first reinforcing plate 81 in between. Thus, since the first reinforcing plate 81 functions as the spacer (third spacer), it is possible to provide a gap between the upper plate portion 514 and the flexible printed board 7 and, consequently, restrain an increase in resistance resulting from contact between the fixation body 5 and the flexible printed board 7.

In the present embodiment, the flexible printed board 7 has the slit 72 extending in the direction intersecting the width direction and the first folded portion 73 is provided by folding the portion of the flexible board 70 provided with the slit 72. By providing the slit 72 in the flexible printed board 7, it is possible to further reduce the resistance in bending the flexible printed board 7 and, consequently, restrain an increase in the swinging load of the movable body 3.

In the present embodiment, the movable body 3 includes the first opposite portion and the second opposite portion spaced from each other in the direction (Y-axis direction) intersecting the optical axis L and the second folded portion 74 is located between the first opposite portion and the second opposite portion. That is, the side surface 311 of the inner holder 31 corresponds to the first opposite portion and the projecting portion 35 provided on the first frame portion 33 of the outer holder 32 corresponds to the second opposite portion. Thus, it is possible to restrict a movement range of the second folded portion 74 and, consequently, restrain an excessive deformation of the flexible printed board 7. In addition, since located within the range overlapping the third reinforcing plate 83 of the second folded portion 74 as viewed from the Y-axis direction, the projecting portion 35 is subject to the restriction of movement merely within the range where the third reinforcing plate 83 is provided. Thus, since the fourth extending portion 742 is freely movable within a range where no third reinforcing plate 83 is provided, it is possible to reduce the resistance of the flexible printed board 7 during the swing of the movable body 3 while restraining an excessive deformation of the flexible printed board 7. Furthermore, since the range where the projecting portion 35 is provided is reduced, it is possible to reduce the size and weight of the outer holder 32 and, consequently, reduce the size and the weight of the movable body 3.

It is to be noted that although the widened portion 71 of the flexible printed board 7 is fixed directly to the fixation body 5 in the above embodiment, a target member where the flexible printed board 7 is to be fixed may be, instead of the fixation body 5, a support member where the fixation body 5 is fixed. For example, a configuration where the flexible printed board 7 is fixed to a casing where the fixation body 5 is housed is possible.

First Modification Example

Figure 8:
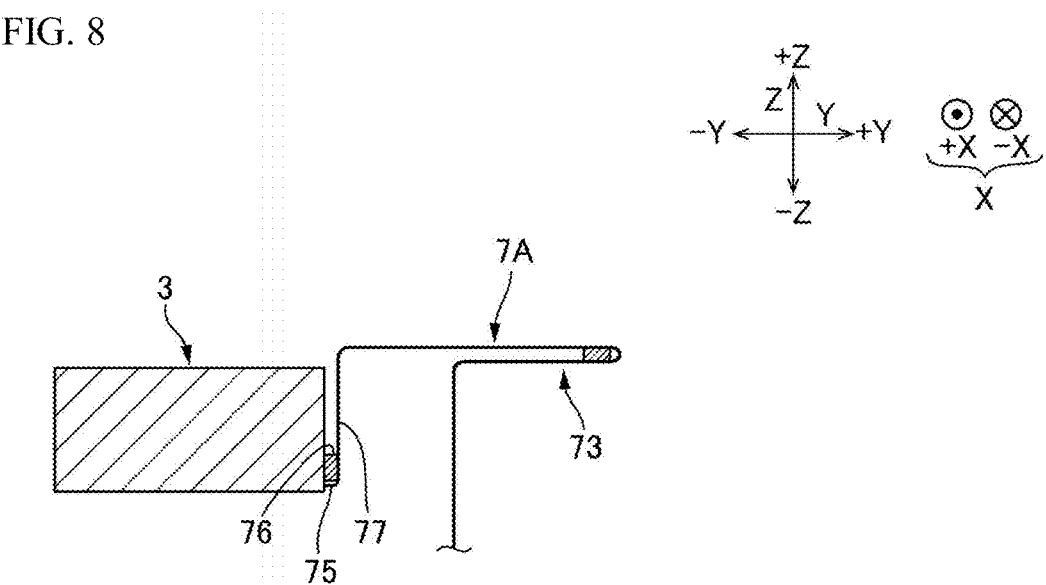
FIG. 8 is an explanatory diagram of a flexible printed board according to a first modification example.

FIG. 8 is an explanatory diagram of a flexible printed board 7A according to a first modification example. The second folded portion 74 extending in the direction of the optical axis L is provided in the above embodiment, whereas the first portion 77 extending in the direction of the optical axis L along the side surface of the movable body 3 is provided in the first modification example. In addition, a portion bent and extending from the first portion 77 in the +Y direction is bent in the direction of the optical axis L and reversely folded to extend in the direction radially toward the swing center P, thereby providing the first folded portion 73.

The first portion 77 is bent from the drawn portion 75 in the direction of the optical axis L, extending along the side surface 311. In addition, only a portion of the first portion 77 in the vicinity of the drawn portion 75 is fixed to the side surface 311, while the other portion thereof is not fixed to the side surface 311. Thus, the first portion 77 is easily deformable with the swing of the movable body 3 around the X axis, making it possible to reduce the resistance of the flexible printed board 7 during the swing of the movable body 3.

Second Modification Example

Figure 9:
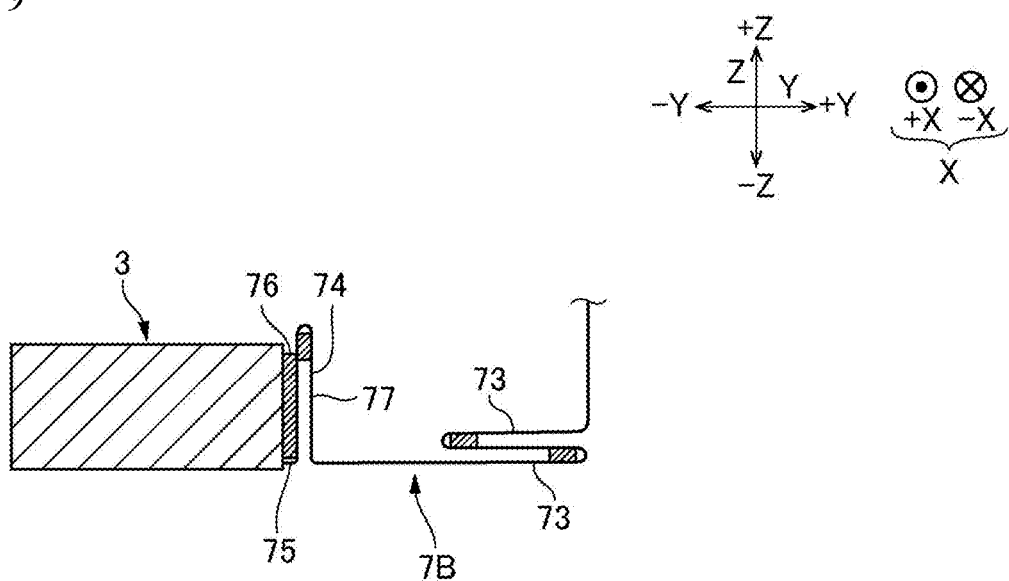
FIG. 9 is an explanatory diagram of a flexible printed board according to a second modification example.

FIG. 9 is an explanatory diagram of a flexible printed board 7B according to a second modification example. The single folded portion extending in the Y-axis direction is provided in the flexible board 70 in the above embodiment, whereas a plurality of first folded portions 73 extending in the Y-axis direction are provided in the second modification example. As shown in FIG. 9, in the second modification example, the flexible board 70, which extends in the Y-axis direction, is reversely folded twice, layering the first folded portion 73 in two tiers. By increasing the number of times to fold the folded portion extending in the Y-axis direction to two or more as above, it is possible to further reduce the resistance of the flexible printed board 7 during the swing of the movable body 3 around the Y axis.

Third Modification Example

Figure 10:
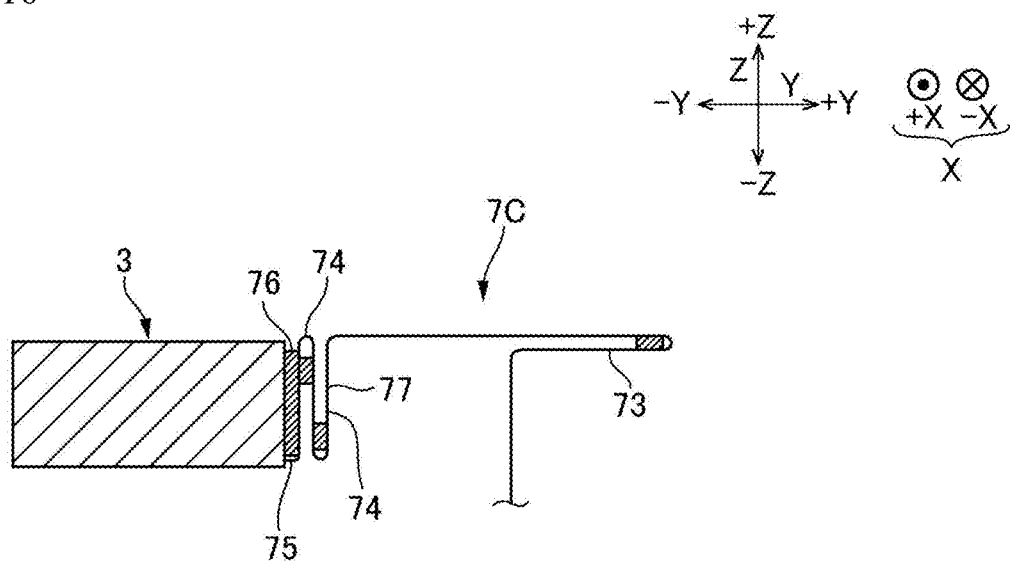
FIG. 10 is an explanatory diagram of a flexible printed board according to a third modification example.

FIG. 10 is an explanatory diagram of a flexible printed board 7C according to a third modification example. The single folded portion extending in the direction of the optical axis L is provided in the flexible board 70 in the above embodiment, whereas a plurality of second folded portions 74 extending in the direction of the optical axis L are provided in the third modification example. As shown in FIG. 10, in the third modification example, the flexible board 70 extending in the direction of the optical axis L is reversely folded twice, layering the second folded portion 74 in two tiers. By increasing the number of times to fold the folded portion extending in the direction of the optical axis L to two or more as above, it is possible to further reduce the resistance of the flexible printed board 7 during the swing of the movable body 3 around the X axis.

Fourth Modification Example

Figure 11:
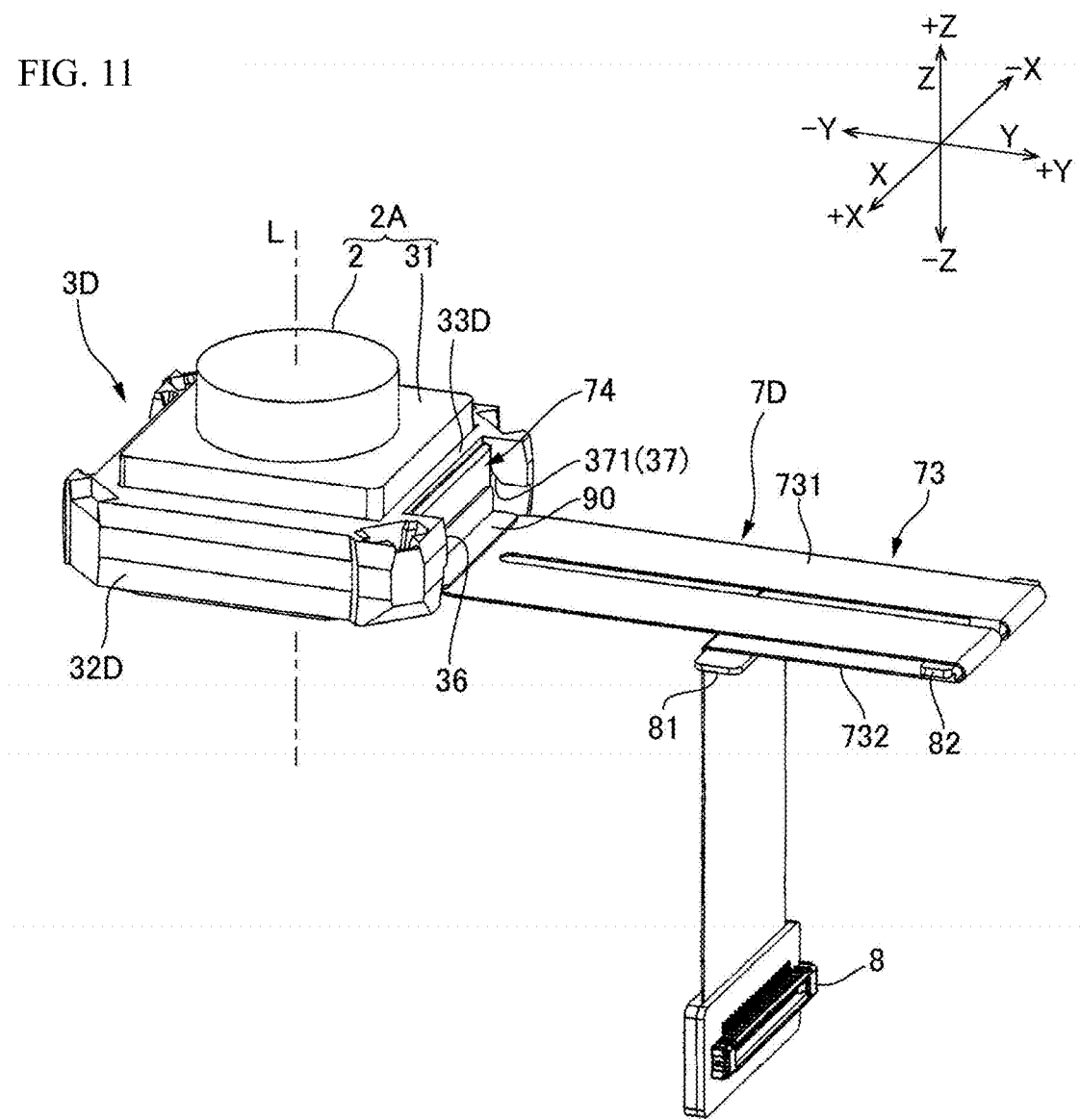
FIG. 11 is a perspective view of a flexible printed board and a movable body according to a fourth modification example.
Figure 12:
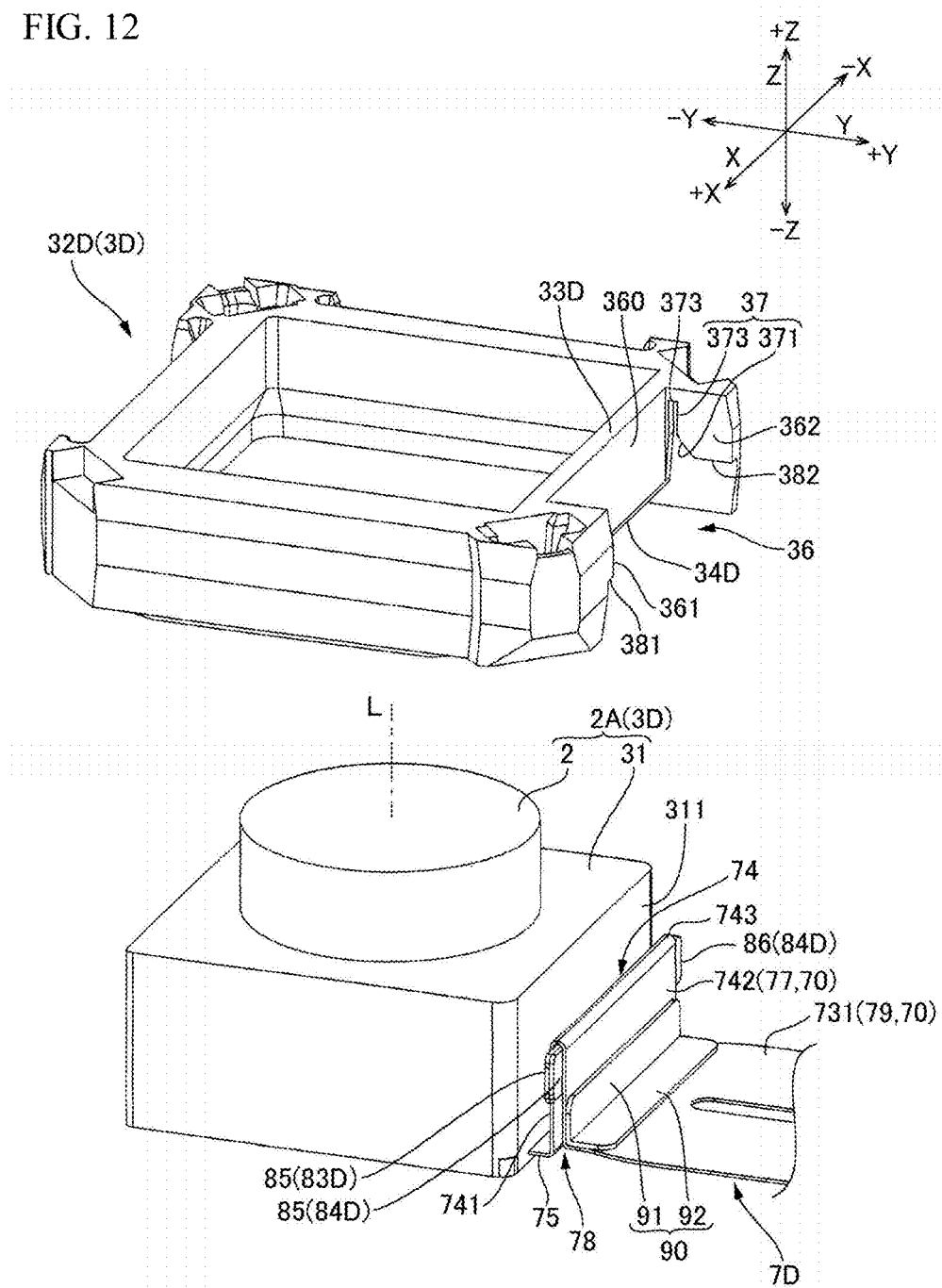
FIG. 12 is an exploded perspective view of the flexible printed board and the movable body according to the fourth modification example.
Figure 13:
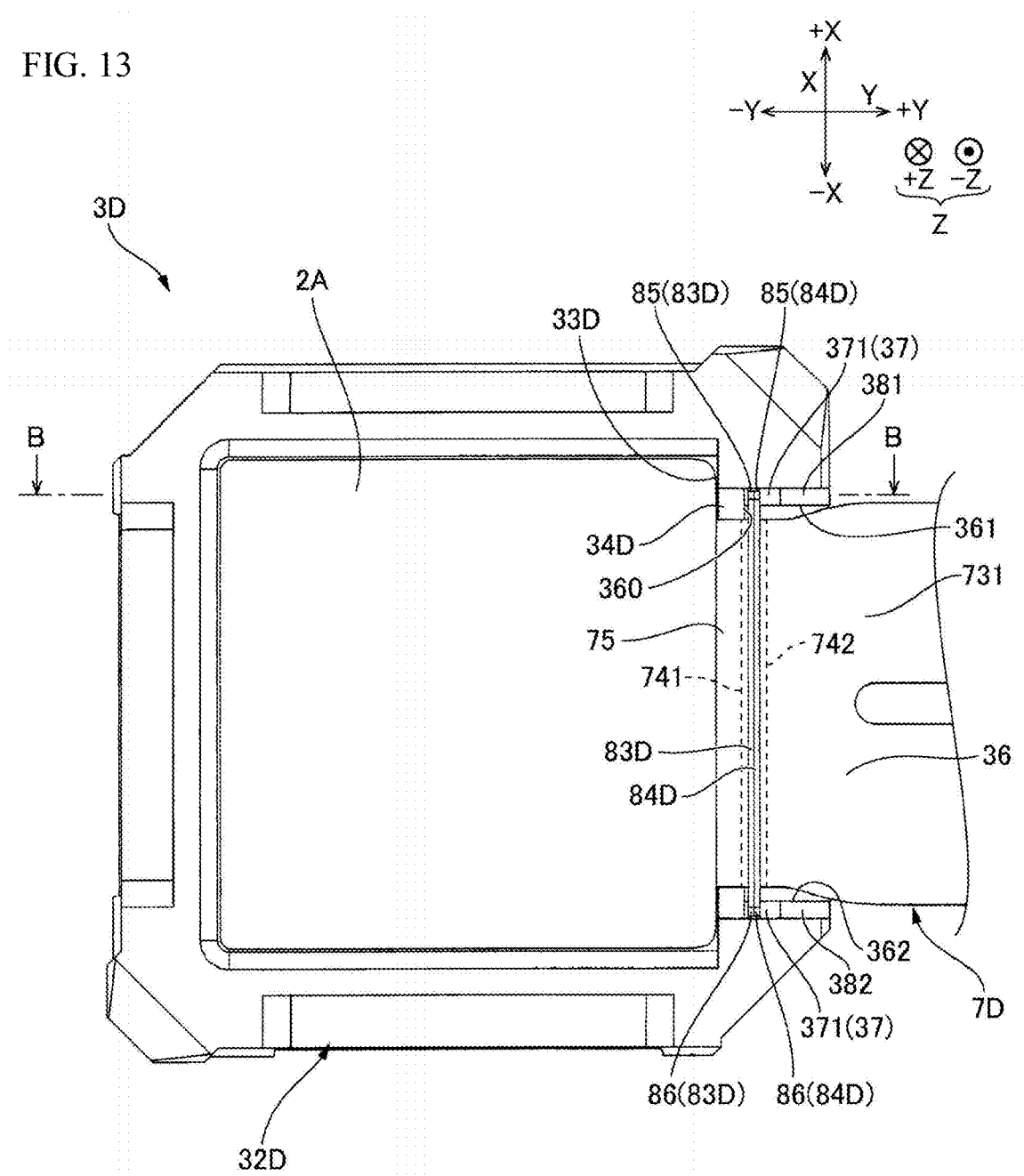
FIG. 13 is a bottom view of the flexible printed board and the movable body according to the fourth modification example.

FIG. 11 is a perspective view of a flexible printed board 7D and a movable body 3D according to a fourth modification example. FIG. 12 is an exploded perspective view of the flexible printed board 7D and the movable body 3D according to the fourth modification example. FIG. 13 is a bottom view of the flexible printed board 7D and the movable body 3D according to the fourth modification example. As shown in FIG. 11, the flexible printed board 7D according to the fourth modification example is drawn in the +Y direction relative to the movable body 3D. The end portion provided with the connector portion 8 is drawn toward the rear side (−Z direction) in the direction of the optical axis L. The flexible printed board 7D includes the first folded portion 73 extending in the direction (Y-axis direction) intersecting the optical axis L and the second folded portion 74 extending in the direction of the optical axis L. After extending in the +Y direction, the first folded portion 73 is bent toward the rear side (−Z direction) in the direction of the optical axis L to be reversely folded. A first reinforcing plate 82 for preventing or restraining contact between the first extending portion 731 and the second extending portion 732 is fixed to the first folded portion 73. In addition, the flexible printed board 7D is fixed to a fixation body (not shown) with the first reinforcing plate 81 in between.

The movable body 3D according to the fourth modification example includes a camera module 2A (optical module) and an outer holder 32D (holder) surrounding an outer peripheral side of the camera module 2A. The camera module 2A is provided by modularizing the inner holder 31 according to the above embodiment, the optical module 2 held in the inner holder 31, and an optical module substrate (not shown) fixed to a −Z-direction end portion of the inner holder 31 and the inner holder 31 constitutes housing for the camera module 2A. The movable body 3D is different from that of the above embodiment in the shape of the outer holder 32D surrounding the outer peripheral side of the camera module 2A. The outer holder 32D includes a first frame portion 33D extending in the X-axis direction along a +Y-direction side surface of the camera module 2A and a +Y-direction side surface of the first frame portion 33D is provided with a recessed portion 36 recessed in the −Y direction. The second folded portion 74 of the flexible printed board 7D is located in the recessed portion 36.

As shown in FIG. 12, the second folded portion 74 includes: the third extending portion 741 and the fourth extending portion 742 extending in the direction of the optical axis L; and the second curved portion 743 extending in a shape reversely bent from the third extending portion 741 to be continuous with the fourth extending portion 742. The third extending portion 741 is bent from the drawn portion 75, which is drawn from the movable body 3D in the +Y direction, toward the front side (+Z direction) in the direction of the optical axis L, extending in the direction of the optical axis L. The fourth extending portion 742 is coupled to the first extending portion 731 of the first folded portion 73 at a rear (−Z-direction) end portion in the direction of the optical axis L.

Shape Retaining Component

The flexible printed board 7D includes the second folded portion 74 extending in the direction of the optical axis L and a bent portion 78 bent substantially at a right angle at a coupling position to the first folded portion 73 extending in the Y-axis direction. As shown in FIG. 12, the bent portion 78 includes the first portion 77 extending in the direction of the optical axis L and a second portion 79 bent from the first portion 77 in the +Y direction (the direction perpendicular to the optical axis L). The first portion 77 corresponds to the fourth extending portion 742 of the second folded portion 74 and the second portion 79 corresponds to a −Y-direction end portion of the first extending portion 731 of the first folded portion 73. A bent plate 90, that is, a shape retaining component that retains the flexible board 70 in a shape bent substantially at a right angle, is fixed to the bent portion 78.

The bent plate 90 (shape retaining component) includes a first plate portion 91 fixed to the first portion 77 and a second plate portion 92 fixed to the second portion 79. The bent plate 90, which includes a metal, is fixed to the first portion 77 and the second portion 79 with an adhesive. It is to be noted that a material of the bent plate 90 is not necessarily limited to a metal but may include a resin or any other material. The bent plate 90 is located inside the bent portion 78, the first plate portion 91 is fixed to a +Y-direction surface of the first portion 77 (i.e., a surface at a side of the second portion 79), and the second plate portion 92 is fixed to a +Z-direction surface of the second portion 79 (i.e., a surface at a side of the first plate portion 91).

Positioning Structure of Second Folded Portion

The flexible printed board 7D according to the fourth modification example includes a third reinforcing plate 83D fixed to the third extending portion 741 and a fourth reinforcing plate 84D fixed to the fourth extending portion 742. The third reinforcing plate 83D and the fourth reinforcing plate 84D are brought into contact with each other in the Y-axis direction as a result of the flexible board 70, which includes the third extending portion 741 and the fourth extending portion 742, being folded to provide the second folded portion 74, thus being located between the third extending portion 741 and the fourth extending portion 742 to function as the second spacer. That is, in the fourth modification example, the second spacer located between the third extending portion 741 and the fourth extending portion 742 is provided by not a single member but two members such as the third reinforcing plate 83D and the fourth reinforcing plate 84D.

The third reinforcing plate 83D and the fourth reinforcing plate 84D are the same in shape. The third reinforcing plate 83D and the fourth reinforcing plate 84D each have an X-axis-direction length larger than a width of each of the third extending portion 741 and the fourth extending portion 742. Thus, the third reinforcing plate 83D and the fourth reinforcing plate 84D each include an end portion 85 projecting from between the third extending portion 741 and the fourth extending portion 742 in the +X direction and an end portion 86 projecting from between the third extending portion 741 and the fourth extending portion 742 in the −X direction.

As shown in FIG. 12, the recessed portion 36 of the first frame portion 33D has a bottom surface 360 located in the −Y direction relative to the second folded portion 74 and a pair of side surfaces 361 and 362 extending respectively from both X-axis-direction ends of the bottom surface 360 in the +Y direction. The pair of side surfaces 361 and 362 face each other in the X-axis direction. The side surfaces 361 and 362 are each provided with a groove portion 37 extending in the X-axis direction (the direction of the optical axis L). As shown in FIG. 13, the second folded portion 74 is held by the first frame portion 33D by inserting the +X-direction end portion 85 of each of the third reinforcing plate 83D and the fourth reinforcing plate 84D in the groove portion 37 of the side surface 361 and inserting the −X-direction end portion 86 of each of the third reinforcing plate 83D and the fourth reinforcing plate 84D in the groove portion 37 of the side surface 362.

Figure 14:
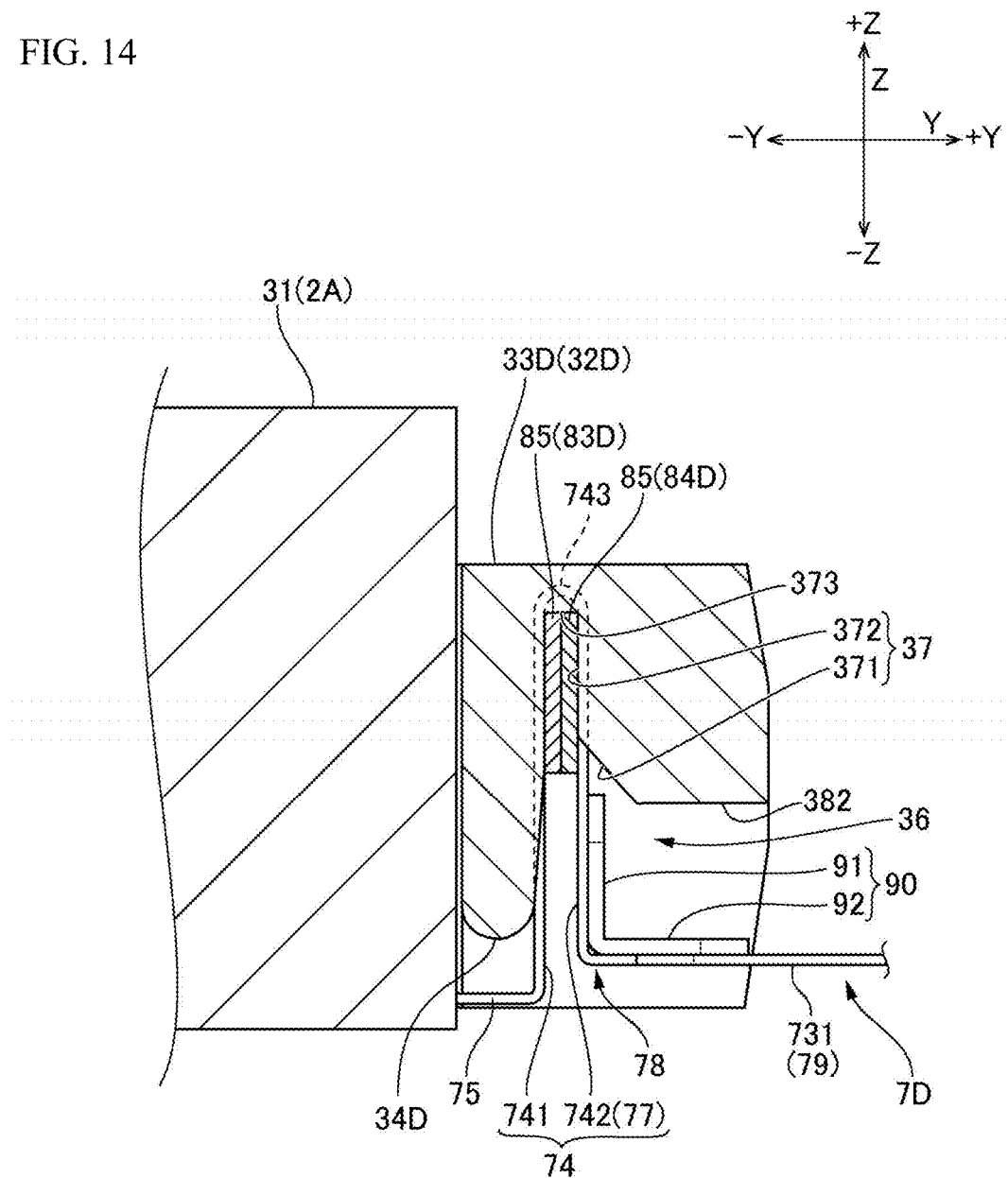
FIG. 14 is a cross-sectional view of a third reinforcing plate, a fourth reinforcing plate, and a groove portion.

FIG. 14 is a cross-sectional view of the third reinforcing plate 83D, the fourth reinforcing plate 84D, and the groove portion 37, that is, a cross-sectional view taken at a B-B position in FIG. 13. Although the B-B position corresponds to a position of the +X-direction end portion 85 of each of the third reinforcing plate 83D and the fourth reinforcing plate 84D, a cross-sectional configuration taken at a position of the −X-direction end portion 86 is the same as FIG. 14. The drawn portion 75 of the flexible printed board 7D is drawn into the recessed portion 36 through a cut portion 34D provided by cutting a −Z-direction end portion of the bottom surface 360 (see FIG. 12) of the recessed portion 36. An edge of the cut portion 34D is chamfered in a curved surface. Damage of the flexible printed board 7D resulting from contact with the edge of the cut portion 34D is thus restrained.

As shown in FIG. 12, the recessed portion 36 has a stepped surface 381 bent in the +X direction from a −Z-direction end portion of the +X-direction side surface 361 and a stepped surface 382 bent in the −X direction from a −Z-direction end portion of the −X-direction side surface 362. The groove portion 37 includes a leading portion 371 extending in the +Z direction from each of the stepped surfaces 381 and 382 and a reinforcing plate holding portion 372 extending in the +Z direction from the leading portion 371. As shown in FIGS. 12 and 14, the reinforcing plate holding portion 372 includes a groove with a constant Y-axis direction width and the leading portion 371 includes a tapered groove with a groove width increased toward an opposite side (i.e., −Z direction) to the reinforcing plate holding portion 372. A +Z-direction end portion of the reinforcing plate holding portion 372 is provided with a flattened stopper surface 373 facing the −Z direction.

The end portions 85 and 86 of the third reinforcing plate 83D and the fourth reinforcing plate 84D are each lightly pressed in the reinforcing plate holding portion 372. By doing so, the third reinforcing plate 83D and the fourth reinforcing plate 84D are positioned in the Y-axis direction. In addition, the third reinforcing plate 83D and the fourth reinforcing plate 84D are positioned in the Z-axis direction by bringing +Z-direction edges of each of the end portions 85 and 86 into abutment with the stopper surface 373 of the reinforcing plate holding portion 372. By positioning the third reinforcing plate 83D and the fourth reinforcing plate 84D in the direction of the optical axis L, the bent portion 78, which couples the second folded portion 74 and the first folded portion 73, is positioned in the direction of the optical axis L. The first folded portion 73 is thus positioned in the direction of the optical axis L.

Figure 15:
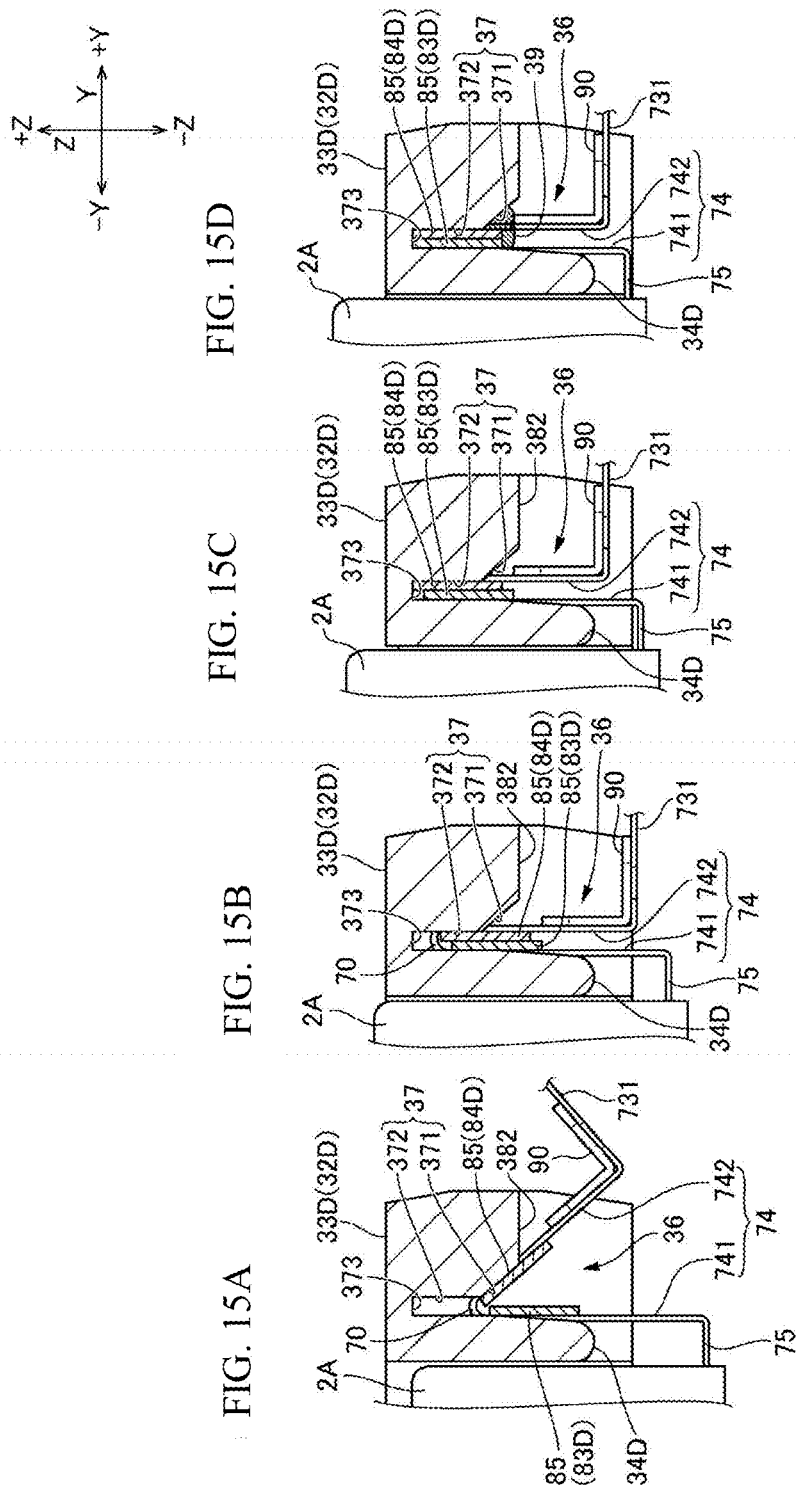
FIGS. 15A, 15B, 15C, and 15D are each an explanatory diagram of a process of folding and positioning the second folded portion.

FIGS. 15A, 15B, 15C, and 15D are each an explanatory diagram of a process of folding and positioning the second folded portion 74. FIG. 15A shows a process of inserting the end portions 85 and 86 of the third reinforcing plate 83D and the fourth reinforcing plate 84D into the leading portion 371 while folding the folding second folded portion 74. FIGS. 5B and 5C each show a process of lightly pressing the end portions 85 and 86 of the third reinforcing plate 83D and the fourth reinforcing plate 84D into the reinforcing plate holding portion 372. FIG. 15D shows a process of bringing the end portions 85 and 86 of the third reinforcing plate 83D and the fourth reinforcing plate 84D into abutment with the stopper surface 373 to be positioned in the Z-axis direction and a process of putting an adhesive in the groove portion 37. Although FIGS. 15A to 15D each show a cross-sectional configuration taken at the position of the +X-direction end portion 85 of each of the third reinforcing plate 83D and the fourth reinforcing plate 84D similarly to FIG. 14, a cross section taken at the position of the −X direction end portion 86 has the same configuration.

In the flexible printed board 7D with the second folded portion 74 being unfolded, the third reinforcing plate 83D is fixed to a portion of the flexible board 70 constituting the third extending portion 741 and the fourth reinforcing plate 84D is fixed to a portion of the flexible board 70 constituting the fourth extending portion 742. As shown in FIG. 15A, the flexible board 70 with the third reinforcing plate 83D and the fourth reinforcing plate 84D fixed is folded, and the folded flexible board 70 is inserted in the recessed portion 36 provided to the first frame portion 33D of the outer holder 32D from the −Z direction while the camera module 2A is inserted inside the outer holder 32D. At this time, the end portions 85 and 86 of the third reinforcing plate 83D and the fourth reinforcing plate 84D, which project toward both X-axis direction sides from between the third extending portion 741 and the fourth extending portion 742, are inserted in the groove portions 37 from sides near the stepped surfaces 381 and 382 of the recessed portion 36, respectively.

In the process shown in FIG. 15A, a −Z-direction edge of the third reinforcing plate 83D is pressed using a jig (not shown), thereby pressing the end portions 85 and 86 of the third reinforcing plate 83D in the +Z direction along a −Y-direction inner surface of the leading portion 371. When the end portions 85 and 86 of the third reinforcing plate 83D are inserted in the leading portion 371, the end portions 85 and 86 of the fourth reinforcing plate 84D, which is continuous with the third reinforcing plate 83D through the flexible board 70, is also inserted in the leading portion 371. By further pressing the third reinforcing plate 83D in the +Z direction, the end portions 85 and 86 of the third reinforcing plate 83D and the fourth reinforcing plate 84D are inserted in the reinforcing plate holding portion 372 from the leading portion 371.

In the process shown in FIG. 15B, the third reinforcing plate 83D and the fourth reinforcing plate 84D, which are in contact with each other in the Y-axis direction, are lightly pressed in the reinforcing plate holding portion 372. By doing so, the third reinforcing plate 83D and the fourth reinforcing plate 84D are positioned in the Y-axis direction. Furthermore, by pressing the third reinforcing plate 83D and the fourth reinforcing plate 84D deep inside the reinforcing plate holding portion 372 using a jig (not shown), one of the third reinforcing plate 83D and the fourth reinforcing plate 84D is brought into abutment with the stopper surface 373 formed deep inside the reinforcing plate holding portion 372 as shown in FIG. 15C.

As shown in FIG. 15D, by pressing the third reinforcing plate 83D and the fourth reinforcing plate 84D until the third reinforcing plate 83D and the fourth reinforcing plate 84D are both brought into abutment with the stopper surface 373, the third reinforcing plate 83D and the fourth reinforcing plate 84D are positioned in the direction of the optical axis L. Next, an adhesive 39 is put in each of the groove portions 37 through the leading portion 371 and cured while the third reinforcing plate 83D and the fourth reinforcing plate 84D are in abutment with the stopper surface 373. By doing so, the third reinforcing plate 83D and the fourth reinforcing plate 84D are each fixed in the groove portion 37.

As described above, in the fourth modification example, the second spacer located between the third extending portion 741 and the fourth extending portion 742 includes the third reinforcing plate 83D fixed to the third extending portion 741 and the fourth reinforcing plate 84D fixed to the fourth extending portion 742. The movable body 3D includes the outer holder 32D surrounding the outer peripheral side of the camera module 2A (optical module) and the outer holder 32D has the groove portions 37 where the end portions 85 and 86 of the third reinforcing plate 83D and the end portions 85 and 86 of the fourth reinforcing plate 84D, which project from between the third extending portion 741 and the fourth extending portion 742, are to be located. The groove portions 37 each have the stopper surface 373 (positioning portion) that positions the third reinforcing plate 83D and the fourth reinforcing plate 84D in the direction of the optical axis L.

In the fourth modification example, it is possible to position the third reinforcing plate 83D and the fourth reinforcing plate 84D in the direction of the optical axis L and the Y-axis direction intersecting the optical axis L. Moreover, it is possible to position the third reinforcing plate 83D and the fourth reinforcing plate 84D in the direction of the optical axis L and, consequently, reduce variation in the folded position of the second folded portion 74. As a result, it is possible to restrain variation in the position of the bent portion 78 in the direction of the optical axis L, the bent portion 78 being bent in the +Y direction from the −Z-direction end portion of the fourth extending portion 741 extending in the −Z direction with a top thereof being a folded portion. It is thus possible to restrain variation in the position in the direction of the optical axis L of the flexible printed board 7D, which is routed in the +Y direction relative to the second folded portion 74.

In the fourth modification example, the groove portions 37 provided on the side surfaces 361 and 362 of the recessed portion 36 include the reinforcing plate holding portions 372 where the end portions 85 and 86 of the third reinforcing plate 83D and the end portions 85 and 86 of the fourth reinforcing plate 84D are to be fitted and the leading portions 371 with the groove width increased toward the opposite sides of the reinforcing plate holding portions 372. This makes it possible to insert the third reinforcing plate 83D and the fourth reinforcing plate 84D in the leading portions 371 while folding the second folded portion 74. In addition, by pressing the third reinforcing plate 83D and the fourth reinforcing plate 84D into the reinforcing plate holding portions 372 from the leading portions 371, it is possible to position the second folded portion 74 in the Y-axis direction while fully folding the second folded portion 74. Thus, it is possible to easily fold the second folded portion 74 and, consequently, easily position the second folded portion 74.

In the fourth modification example, the end portions 85 and 86 of the third reinforcing plate 83D and the end portions 85 and 86 of the fourth reinforcing plate 84D are pressed in the reinforcing plate holding portions 372. It is thus possible to enhance an accuracy in positioning the third reinforcing plate 83D and the fourth reinforcing plate 84D in the Y-axis direction. In addition, it is possible to temporarily fix the third reinforcing plate 83D and the fourth reinforcing plate 84D in the groove portions 37 before being fixed using the adhesive 39.

The flexible printed board 7D according to the fourth modification example includes the bent portion 78 including the first portion 77 and the second portion 79 bent from the first portion 77 in the direction (+Y direction) intersecting the optical axis L, and the shape retaining component that retains the shape of the bent portion 78 is fixed to the bent portion 78. The shape retaining component, which is the bent plate 90, includes the first plate portion 91 fixed to the first portion 77 extending in the direction of the optical axis L and the second plate portion 92 fixed to the second portion 79 extending in the +Y direction. By fixing the bent plate 90 (shape retaining component) to the bent portion 78 as above, it is possible to prevent the bent portion 78 from opening over time and, consequently, restrain a change in an initial attitude of the movable body 3D with a change in the shape of the flexible printed board 7D over time. Thus, it is possible to restrain an adverse influence on characteristics of the optical unit with a shake correction function. Moreover, in a case where the bent shape of the flexible printed board 7D is achieved by fixation to the bent plate 90 (shape retaining component), it is not necessary to plastically deform the flexible board 70 to maintain the bent shape, so that damage at a bent position can be reduced. Therefore, it is possible to reduce fatigue breakage of wirings on the flexible printed board 7D resulting from a bending process.

In the fourth modification example, the bent plate 90 is used as the shape retaining component, making it possible to reduce the thickness of the shape retaining component and, consequently, reduce the installation space. Thus, it is possible to reduce interference of the shape retaining component with a fixation body (not shown) or the movable body 3D. Moreover, the bent plate 90 is located inside the bent portion 78 and fixed to the +Y-direction surface of the first portion 77. Thus, since the bent plate 90 is located opposite the movable body 3D with respect to the flexible printed board 7D, it is possible to prevent or restrain interference between the bent plate 90 and the movable body 3D.

Modification Example of Shape Retaining Component

Figure 16:
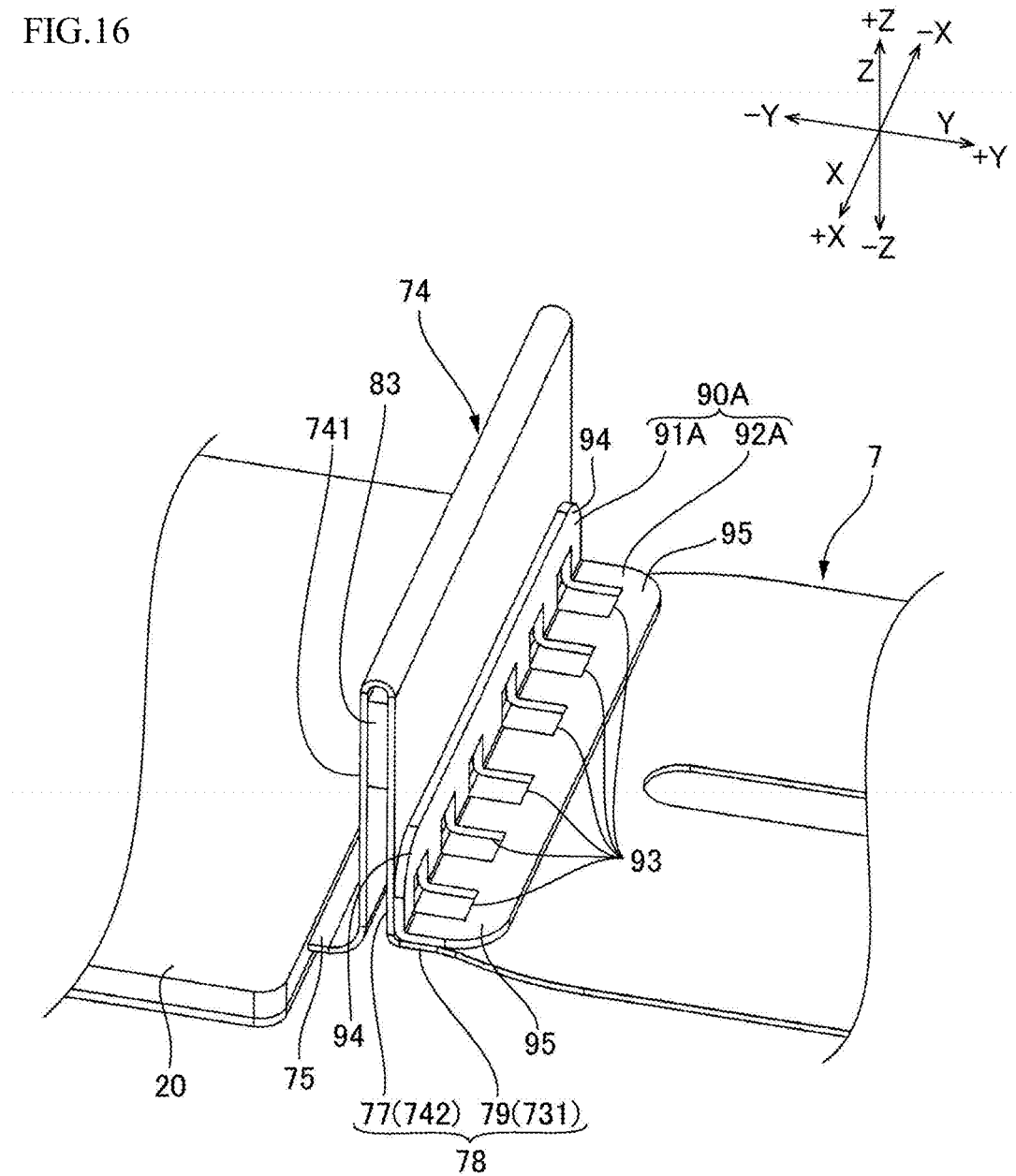
FIG. 16 is a perspective view of a bent portion of the flexible printed board and a shape retaining component.
Figure 17:
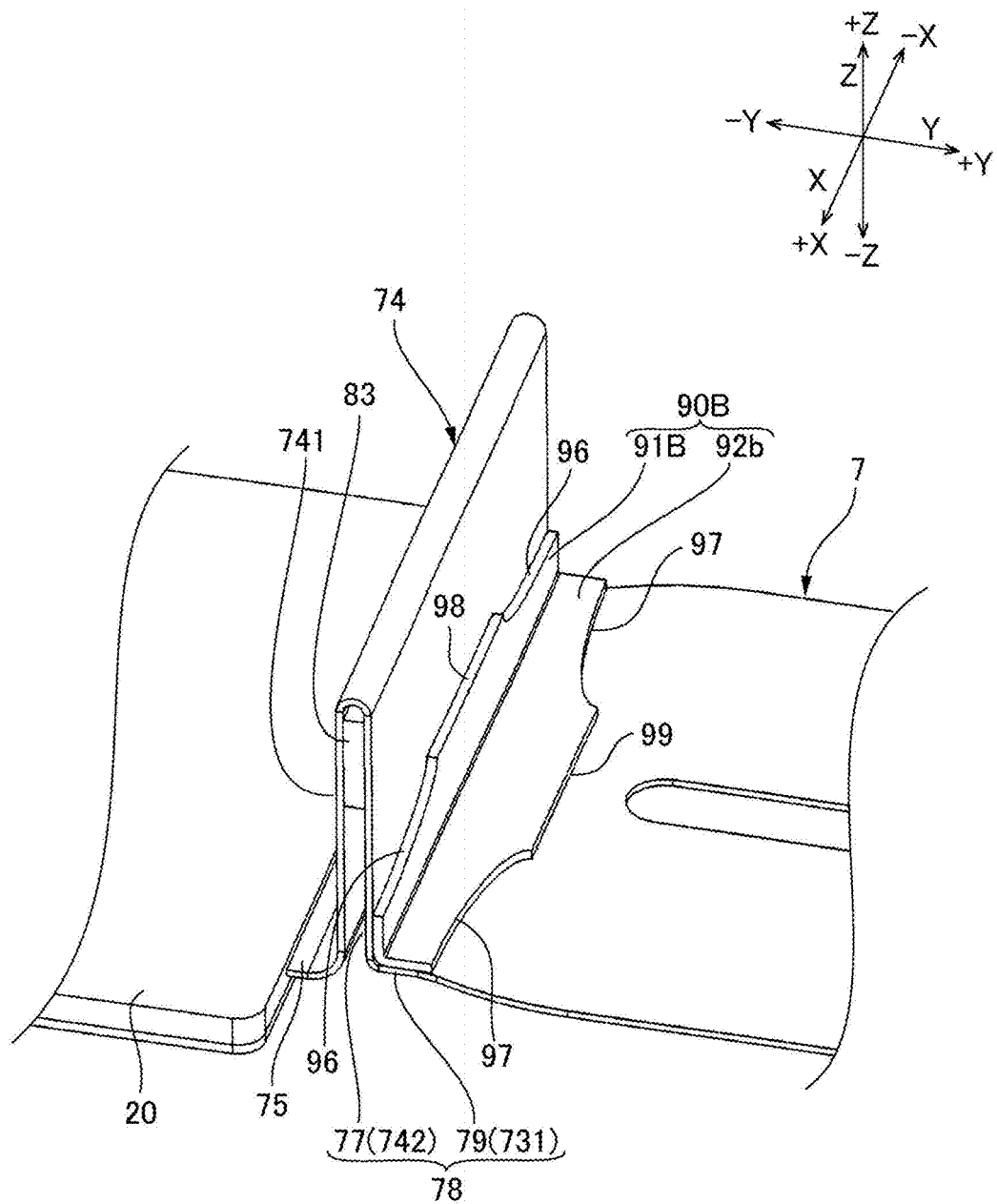
FIG. 17 is a perspective view of the bent portion of the flexible printed board and a shape retaining component according to a modification example.

The configuration of the shape retaining component is not limited to the configuration shown in FIG. 12. FIG. 16 is an explanatory diagram of a first modification example of the shape retaining component and FIG. 17 is an explanatory diagram of a second modification example of the shape retaining component. As shown in FIG. 16, the shape retaining component according to the first modification example is a bent plate 90A including a first plate portion 91A and a second plate portion 92A bent from the first plate portion 91A substantially at a right angle. The bent plate 90A has a plurality of opening portions 93. The opening portions 93 are each in the shape of a slit and arranged at regular intervals in the X-axis direction. The opening portions 93 each penetrate the first plate portion 91A and the second plate portion 92A. It is possible to reduce the weight of the bent plate 90A by providing the opening portions 93.

The flexible printed boards 7, 7A, 7B, 7C, and 7D with the above configurations each include the first portion 77 extending in the direction of the optical axis L and the second portion 79 bent from the first portion 77 substantially at a right angle, and thus include the bent portion 78. Accordingly, any of the above configurations allows the bent plate 90 and a modification example thereof (first modification example, second modification example) to be attached to the bent portion 78. FIG. 16 shows a state where the bent plate 90A according to the first modification example is attached to the bent portion 78 of the flexible printed board 7 configured as shown in FIG. 3. The flexible printed board 7 is drawn in the +Y-direction from the optical module substrate 20 fixed to a bottom portion of an inner holder (not shown). The bent plate 90A according to the first modification example has the opening portions 93 and the opening 93 can be used as an adhesive receiver in fixing the bent portion 78 with the adhesive.

The bent plate 90A according to the first modification example has a first cut portion 94 provided by cutting a corner of the first plate portion 91A in an arc and a second cut portion 95 provided by cutting a corner of the second plate portion 92A in an arc. The first cut portion 94 is provided in the first plate portion 91A at each of both ends of an edge (i.e., +Z-direction edge) opposite to the second plate portion 92A. Meanwhile, the second cut portion 95 is provided in the second plate portion 92A at each of both ends of an edge (i.e., +Y-direction edge) opposite to the first plate portion 91A. By cutting both X-axis-direction end portions of the bent plate 90A as above, it is possible to restrain an increase in a spring constant of the flexible printed board 7 resulting from the bent plate 90A being attached.

It is to be noted that the effect in restraining an increase in the spring constant of the flexible printed board 7 is achieved mainly by providing the second cut portion 95 in the second plate portion 92A and the first cut portion 94 provided in the first plate portion 91A is less effective in restraining an increase in the spring constant of the flexible printed board 7. Accordingly, the first cut portion 94 may be omitted. The first cut portion 94 and the second cut portion 95 of the bent plate 90A according to the first modification example are the same in shape. Thus, the bent plate 90A is in a shape symmetric with respect to a folded position where the first plate portion 91A and the second plate portion 92A are coupled. This eliminates the necessity of considering a component orientation in attaching the bent plate 90A, making it possible to reduce difficulty in an attachment operation.

As shown in FIG. 17, the shape retaining component according to the second modification example is a bent plate 90B including a first plate portion 91B and a second plate portion 92B bent from the first plate portion 91B substantially at a right angle. The bent plate 90B has a first cut portion 96 provided by cutting a +Z-direction edge of the first plate portion 91B and a second cut portion 97 provided by cutting a +Y-direction edge of the second plate portion 92A. The first plate portion 91B is provided with a protruding portion 98 that protrudes in the +Z direction in a X-axis-direction middle and a first cut portion 94 at each of both sides of the protruding portion 98. Similarly, the second plate portion 92B is provided with a protruding portion 99 that protrudes in the +Y direction in a X-axis-direction middle and a second cut portion 95 at each of both sides of the protruding portion 99. The first cut portion 96 and the second cut portion 97 are the same in shape and the bent plate 90B is in a shape symmetric with respect to a folded position where the first plate portion 91B and the second plate portion 92B are coupled.

The bent plate 90B according to the second modification example has a larger area cut to provide the first cut portion 96 and the second cut portion 97 than a cut area in the bent plate 90A according to the first modification example and is thus more effective in restraining an increase in the spring constant of the flexible printed board 7 than the bent plate 90A according to the first modification example. Here, the X-axis-direction middle of the first plate portion 91B and the X-axis-direction middle of the second plate portion 92B are not cut but respectively provided with the protruding portions 98 and 99, since cutting the X-axis-direction middle portion of each of the first plate portion 91B and the second plate portion 92B is less effective in restraining an increase in the spring constant of the flexible printed board 7. By cutting both X-axis-direction end portions of each of the first plate portion 91B and the second plate portion 92B of the bent plate 90B according to the second modification example, it is possible to effectively restrain an increase in the spring constant of the flexible printed board 7.

What is claimed is:

1. An optical unit with a shake correction function, the optical unit comprising:
 a movable body including an optical module;
 a swing support mechanism to support the movable body swingably around a first axis intersecting an optical axis, and to support the movable body swingably around a second axis intersecting the optical axis and the first axis;

a fixation body to support the movable body via the swing support mechanism;

a magnetic drive mechanism for swing to cause the movable body to swing around the first axis and around the second axis; and a flexible printed board coupled to the movable body, wherein the flexible printed board includes:
- a fixation portion directly or indirectly fixed to the fixation body;
- a first portion located between a portion coupled to the movable body and the fixation portion, the first portion extending in a direction of the optical axis along the movable body;
- a first folded portion located between the first portion and the fixation portion, the first folded portion extending in a direction intersecting the optical axis and reversely folded; and
- a second folded portion extending in the direction of the optical axis and reversely folded once, and wherein the second folded portion includes the first portion.

2. The optical unit with a shake correction function according to claim 1, wherein the first folded portion extends in a direction radially away from a swing center of the movable body and then is reversely folded to extend in a direction radially toward the swing center.

3. The optical unit with a shake correction function according to claim 1, wherein the first folded portion is bent in a direction toward a swing center in the direction of the optical axis to be reversely folded.

4. The optical unit with a shake correction function according to claim 1,
wherein the first folded portion includes a first extending portion and a second extending portion that overlap as viewed from the direction of the optical axis, and
wherein a spacer is located between the first extending portion and the second extending portion.

5. The optical unit with a shake correction function according to claim 1, wherein the flexible printed board comprises a plurality of the first folded portions.

6. The optical unit with a shake correction function according to claim 1,
wherein the second folded portion includes a third extending portion and a fourth extending portion that overlap as viewed from a direction perpendicular to the optical axis, and
wherein a second spacer is located between the third extending portion and the fourth extending portion.

7. The optical unit with a shake correction function according to claim 6,
wherein the movable body includes a first opposite portion and a second opposite portion spaced from each other in the direction intersecting the optical axis,
wherein the first portion is located between the first opposite portion and the second opposite portion,
wherein the second opposite portion is located at an outer peripheral side of the first opposite portion, and
wherein the second opposite portion is located within a range that overlaps the second spacer as viewed from the direction perpendicular to the optical axis.

8. The optical unit with a shake correction function according to claim 6,
wherein the second spacer includes a third reinforcing plate fixed to the third extending portion and a fourth reinforcing plate fixed to the fourth extending portion,
wherein the movable body includes a holder surrounding an outer peripheral side of the optical module,
wherein the holder has a groove portion to receive an end portion of the third reinforcing plate and an end portion of the fourth reinforcing plate, the end portion of the third reinforcing plate and the end portion of the fourth reinforcing plate projecting from between the third extending portion and the fourth extending portion, and
wherein the groove portion includes a positioning portion to position the third reinforcing plate and the fourth reinforcing plate in the direction of the optical axis.

9. The optical unit with a shake correction function according to claim 8, wherein the groove portion includes
a reinforcing plate holding portion where the end portion of the third reinforcing plate and the end portion of the fourth reinforcing plate are to be fitted and
a leading portion with a groove width increased toward a side opposite to the reinforcing plate holding portion.

10. The optical unit with a shake correction function according to claim 9, wherein the end portion of the third reinforcing plate and the end portion of the fourth reinforcing plate are pressed in the reinforcing plate holding portion.

11. A method of producing the optical unit with a shake correction function according to claim 6, the method comprising:
fixing, before the second folded portion is folded, a third reinforcing plate to a portion corresponding to the third extending portion and a fourth reinforcing plate to a portion corresponding to the fourth extending portion in the flexible printed board; and
folding the second folded portion at a predetermined bent position by bringing the third reinforcing plate and the fourth reinforcing plate into contact with each other in the direction intersecting the optical axis to align positions of the third reinforcing plate and the fourth reinforcing plate in the direction of the optical axis with each other.

12. The method of producing the optical unit with a shake correction function according to claim 11,
wherein the movable body includes a holder surrounding an outer peripheral side of the optical module, and
wherein the positions of the third reinforcing plate and the fourth reinforcing plate in the direction of the optical axis are aligned, by inserting an end portion of the third reinforcing plate and an end portion of the fourth reinforcing plate in a groove portion provided in the holder and bringing the end portion of the third reinforcing plate and the end portion of the fourth reinforcing plate into abutment with a positioning portion provided in the groove portion.

13. The method of producing the optical unit with a shake correction function according to claim 12, further including putting an adhesive in the groove portion after the end portion of the third reinforcing plate and the end portion of the fourth reinforcing plate are inserted in the groove portion to align the positions of the third reinforcing plate and the fourth reinforcing plate in the direction of the optical axis.

14. The optical unit with a shake correction function according to claim 1, wherein the flexible printed board comprises a plurality of the second folded portions.

15. The optical unit with a shake correction function according to claim 1, wherein the flexible printed board includes a drawn portion drawn from the movable body in the direction intersecting the optical axis, and wherein the second folded portion includes a portion bent to extend from the drawn portion in the direction of the optical axis and at least partly fixed to the movable body.

16. The optical unit with a shake correction function according to claim 1, wherein the fixation portion is fixed to the fixation body via a third spacer.

17. The optical unit with a shake correction function according to claim 1, wherein the flexible printed board has a slit extending in a direction intersecting a width direction.

18. The optical unit with a shake correction function according to claim 1,
wherein the flexible printed board includes a bent portion having the first portion and a second portion, the second portion bent from the first portion in the direction intersecting the optical axis, and
wherein a shape retaining component to retain a shape of the bent portion is fixed to the bent portion.

19. The optical unit with a shake correction function according to claim 18, wherein the shape retaining component is a bent plate including a first plate portion fixed to the first portion and a second plate portion extending in a direction intersecting the first plate portion and fixed to the second portion.

20. The optical unit with a shake correction function according to claim 19, wherein the bent plate has a first cut portion provided in the first plate portion at each of both ends of an edge opposite to the second plate portion and a second cut portion provided in the second plate portion at each of both ends of an edge opposite to the first plate portion.

21. The optical unit with a shake correction function according to claim 19, wherein the bent plate has an opening portion.

22. The optical unit with a shake correction function according to claim 19, wherein the bent plate is located inside the bent portion.

23. An optical unit with a shake correction function, the optical unit comprising:
a movable body including an optical module;
a swing support mechanism to support the movable body swingably around a first axis intersecting an optical axis, and to support the movable body swingably around a second axis intersecting the optical axis and the first axis;
a fixation body to support the movable body via the swing support mechanism;
a magnetic drive mechanism for swing to cause the movable body to swing around the first axis and around the second axis; and
a flexible printed board coupled to the movable body,
wherein the flexible printed board includes:
a fixation portion directly or indirectly fixed to the fixation body;
a first portion located between a portion coupled to the movable body and the fixation portion, the first portion extending in a direction of the optical axis along the movable body; and
a first folded portion located between the first portion and the fixation portion, the first folded portion extending in a direction intersecting the optical axis and reversely folded,
wherein the movable body includes a first opposite portion and a second opposite portion spaced from each other in the direction intersecting the optical axis, and
wherein the first portion is located between the first opposite portion and the second opposite portion.

* * * * *